US006971267B2

(12) United States Patent
Kawai et al.

(10) Patent No.: US 6,971,267 B2
(45) Date of Patent: Dec. 6, 2005

(54) METHOD AND PROCESSOR FOR OBTAINING MOMENTS AND TORQUES IN A BIPED WALKING SYSTEM

(75) Inventors: Masakazu Kawai, Saitama (JP); Yasushi Ikeuchi, Saitama (JP); Behzad Dariush, Sunnyvale, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 74 days.

(21) Appl. No.: 10/642,478

(22) Filed: Aug. 15, 2003

(65) Prior Publication Data

US 2004/0107780 A1 Jun. 10, 2004

Related U.S. Application Data

(60) Provisional application No. 60/421,964, filed on Oct. 28, 2002, and provisional application No. 60/413,024, filed on Sep. 23, 2002.

(51) Int. Cl.[7] ................................................ A61B 5/22
(52) U.S. Cl. .................................................. 73/379.01
(58) Field of Search ........................ 318/568.12, 568.11, 318/568.22; 73/379.01, 397.01

(56) References Cited

U.S. PATENT DOCUMENTS

| 5,362,288 | A | * | 11/1994 | Razon ......................... 482/51 |
| 5,432,417 | A | * | 7/1995 | Takenaka et al. ...... 318/568.12 |
| 5,808,433 | A | * | 9/1998 | Tagami et al. ......... 318/568.12 |
| 6,152,890 | A | | 11/2000 | Kupfer et al. |

FOREIGN PATENT DOCUMENTS

JP    2000-249570    9/2000

OTHER PUBLICATIONS

Kato, H. and Hirata, T., "The Concept of a Walking Assistance Suit", The Japanese Society of Mechanical Engineers, Aug. 2001.
R. Wells, M. Morrisey, and R. Hughson, "Internal and Physiological Responses During Concentric and Eccentric Cycle Ergometry", Eur. J. Appl. Physiol, 55: 291–301, 1986.
Gagnon, M. and Smith, G., "Muscular Mechanical Energy Expenditure as a Process for Detecting Potential Risks in Manual Materials Handling", J. Biomechanics, vol. 24, No. 3/4; pp. 191–203, Nov. 1991.
Winter, D.A., "Biomechanics and Motor Control of Human Movement", 2$^{nd}$ Edition, John Wiley & Sons, Inc., pp. 51–74.
Gagnon D., and Gagnon, M., "The Influence of Dynamic Factors on Triaxial Net Muscular Moments at the L5/S1 Joint During Asymmetrical Lifting and Lowering", Journa of Biomechanics, vol. 25, pp. 891–901, 1992.
Hsiang, S.H., and McGorry, R.W., "Three Different Lifting Strategies for Controlling the Motion Patterns of the External Load", Ergonomics, vol. 40, pp. 928–939, 1997.

* cited by examiner

*Primary Examiner*—Edward Lefkowitz
*Assistant Examiner*—Jewel V. Thompson
(74) *Attorney, Agent, or Firm*—Fenwick & West LLP

(57) ABSTRACT

A method and processor for obtaining torques to be applied to joints of a leg of a biped walking system are provided. The method comprises the steps of obtaining moments acting around the joints of the leg, using the vertical component of the ground reaction force acting on the leg at the point of application of the ground reaction force, the vertical components of forces acting on the joints of the leg and a term of the acceleration of gravity and without using the horizontal components of the forces acting on the joints of the leg and a term of acceleration except the term of the acceleration of gravity and obtaining the torques to be applied to the joints of the leg, based on the moments acting around the joints of the leg. The vertical component of the ground reaction force acting on the leg, is obtained based on which leg or legs are in contact with the ground. The processor is configured to perform the above steps.

12 Claims, 14 Drawing Sheets

FIG. 1
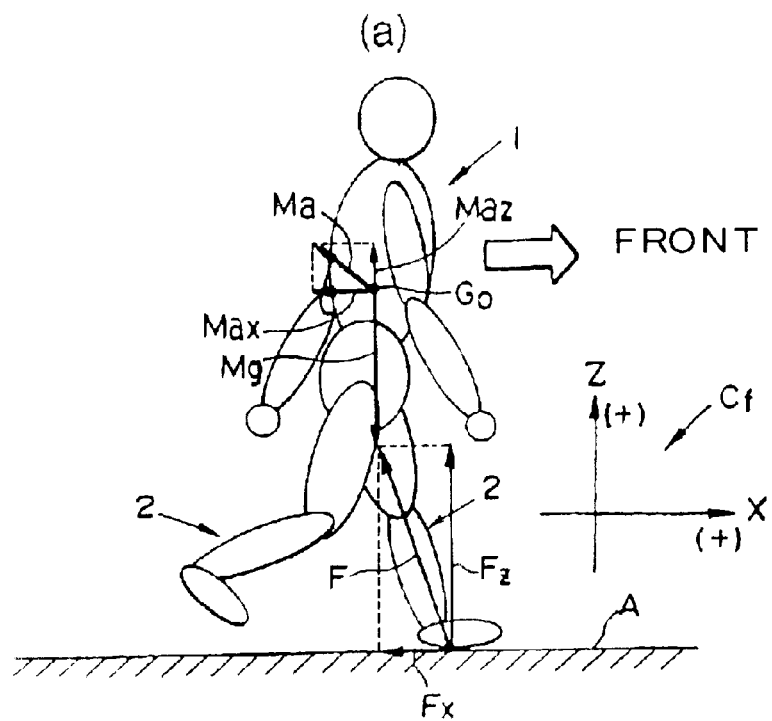
(a)
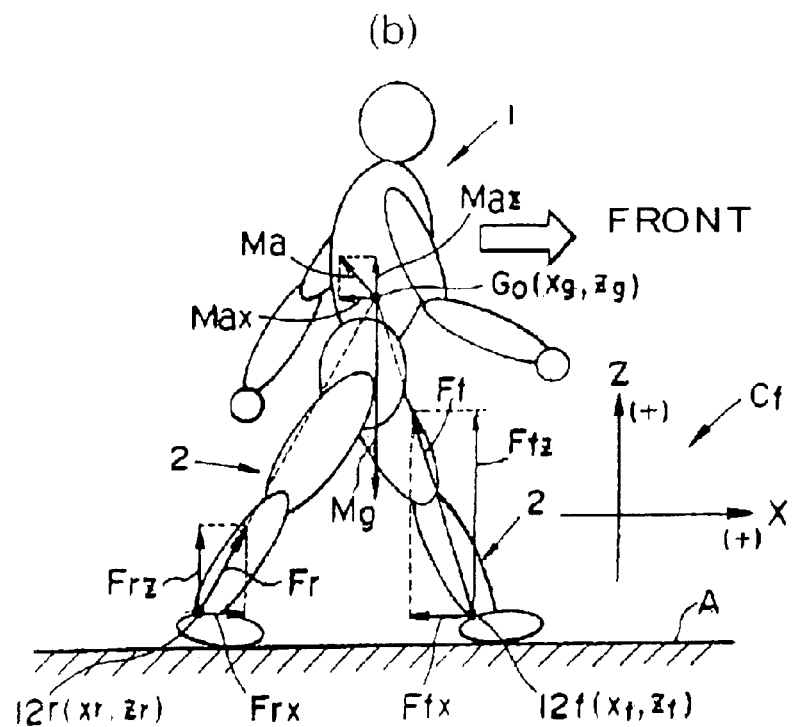
(b)

METHOD AND PROCESSOR FOR OBTAINING MOMENTS AND TORQUES IN A BIPED WALKING SYSTEM

CROSS-REFERENCE TO RELATED APPLICATIONS

This application claims priority of U.S. provisional applications No. 60/413,024 filed on Sep. 23, 2002 and No. 60/421,964 filed on Oct. 28, 2002.

FIELD OF THE INVENTION

The present invention relates to a method for obtaining moments acting on joints of legs of biped walking system such as biped walking robots. The present invention further relates to a method for obtaining torques to be given to joints of legs.

BACKGROUND OF THE INVENTION

It is required to obtain ground reaction forces acting on legs of a biped walking system and then based on the ground reaction forces to obtain moments acting on joints of the legs of the biped walking system, in control of human assist systems and in control of movement of biped walking robots. Such human assist systems are intended to assist human operations against gravity including going up and down stairs, sitting and standing up, squatting, and moving up and down with heavy load. Based on data including the obtained moments, assist torques for human assist systems or a target driving torque for each joint of biped walking robots can be determined.

Japanese Patent Application Unexamined Publication (KOKAI) No. 2000-249570 discloses a method for obtaining ground reaction forces. In this technique, ground reaction forces acting on legs are obtained as a linear combination of trigonometric functions having different periods of $1/n$ ($n=1, 2, \ldots$) of a walking period, because waveforms representing temporal changes in ground reaction forces acting on legs, periodically change while a biped walking system is normally walking. In this case, as weighting factors of respective trigonometric functions for the combination, fixed values predetermined for each biped walking system or those obtained by adjusting the fixed values according to geographic features, are employed.

However, in the above technique, ground reaction forces acting on legs are obtained for a step or steps of biped walking systems and therefore accurate ground reaction forces can hardly be obtained in such a case as walking manner of biped walking systems successively changes. Further, for higher accuracy of ground reaction forces to be obtained, weighting factors of trigonometric functions must be set for each biped walking system and must be adjusted according geographic features. So, it is very difficult to obtain accurate ground reaction forces without being affected by environment where biped walking systems move and by individual variation of biped walking systems.

U.S. Pat. No. 6,152,890 discloses an apparatus and a method to measure load of working persons. However, the apparatus and method do not enable accurate measurement of torques acting on the joints.

As to biped waking robots, for example, a method is known, in which sensors such as 6-axis force sensors are set to ankles or feet of the robots to obtain ground reaction forces. Further, another method is known in which biped walking systems are made to walk on a force plate on the floor to obtain ground reaction forces based on outputs of the force plate.

However, in techniques using force sensors, it is necessary to attach force sensors to ankles and feet of a person in order to obtain ground reaction forces acting on the legs of the person. Such force sensors hinder the person from walking in his or her daily life. Further, in techniques using a force plate, ground reaction forces can be obtained only under an environment in which the force plate has been installed.

In conventional human assist systems, differential operations are used to obtain moments on joints of legs and the differential operations cause noises of moments on joints of legs. Additionally, horizontal components of forces are used to obtain moments on joints of legs. Since horizontal forces, or accelerations are hard to measure, measured horizontal forces cause errors in moments on joints of legs. Further, many acceleration terms must be obtained. Accordingly, huge amount of differential operations might restrict real-time processing.

Under the situation mentioned above, there is a great need for a simpler joint moment estimation method by which moments acting on joints of legs can be obtained accurately and in real time, particularly for persons as biped walking systems.

Additionally, there is a great need for a real-time and robust control method of biped walking systems by which torques such as assist torques applied to joints of legs in human assist systems or the like, can be obtained.

SUMMARY OF THE INVENTION

First, the basic idea of an estimation method of ground reaction forces, used in joint moment estimation method for biped walking systems of the present invention, will be described below.

Motions of biped walking systems, for example, motions of legs in walking, include a single-support phase in which one of the legs (2, 2) of a biped walking system is in contact with the ground as shown in FIG. 1(a) and a double-support phase in which both of the legs (2, 2) are in contact with the ground as shown in FIG. 1(b).

In a single-support phase, the equation of (translational) motion of the center of gravity of the biped walking system in the absolute coordinate system fixed to the ground on which the biped walking system moves, represents such a relationship as below. That is, the relationship is that a product of an acceleration of the center of gravity and a weight (mass) of the biped walking system equals the resultant of gravity (a product of the weight of the biped walking system and the acceleration of gravity) and the ground reaction force acting on the leg in contact with the ground.

More specifically, if component in the X direction (the horizontal direction in which the biped walking system (1) moves) and that in the Z direction (the vertical direction) of acceleration a of the center of gravity G0 of the biped walking system, are represented as ax and az and component in the X direction and that in the Z direction of the ground reaction force F are represented as Fx and Fz, as shown in FIG. 1(a), the equation of motion of the center of gravity G0 is represented as below.

$$^T(Fx, Fz-M \cdot g) = M \cdot ^T(ax, az) \tag{1}$$

where M is a weight of the biped walking system and g is the acceleration of gravity.

In both sides of Equation (1), $^T(,)$ represents a two-component vector. Hereinafter, a notation in the form of $^T(,)$ represents a vector.

Provided that a term of acceleration except a term of the acceleration of gravity, is negligible, the following equation can be obtained for the vertical component Fz of a ground reaction force.

$$Fz = M \cdot (az + g) \quad (2)$$

In this case, the weight M required to obtain an estimated value of the ground reaction force F can be previously obtained by measurement or the like.

In a double-support phase, the equation of (translational) motion of the center of gravity of the biped walking system, represents such a relationship as below. That is, the relationship is that a product of an acceleration of the center of gravity and a weight of the biped walking system equals the resultant of gravity (a product of the weight of the biped walking system and the acceleration of gravity) and two ground reaction forces acting on the both legs. The two ground reaction forces act respectively on the both legs at portions in contact with the floor. More specifically, if X and Z components of ground reaction force Ff acting on the leg (2) in the front in the direction of travel are represented as Ffx and Ffz and the X and Z components of ground reaction force Fr acting on the leg (2) in the rear are represented as Frx and Frz, the equation of motion of the center of gravity can be represented as below.

$$^T(Ffx+Frx, Ffz+Frz-M \cdot g) = M \cdot {}^T(ax, az) \quad (3)$$

where ax, az, M and g in Equation (3) are described above.

Provided that a term of acceleration except a term of the acceleration of gravity, is regarded as negligible and the both legs bear an equal amount of gravity, the following equation can be obtained.

$$Ffz = Frz = (\tfrac{1}{2}) \cdot M \cdot g \quad (4)$$

Accordingly, estimated values of the vertical components Ffz and Frz of a ground reaction force of each of the legs can be obtained by substituting a value of weight M of the biped walking system and a value of the acceleration of gravity g into Equation (4).

In this case, the weight M required to obtain estimated values of the vertical components Ffz and Frz can be previously obtained by measurement or the like.

If terms of accelerations except terms of the acceleration of gravity and terms of the horizontal components of forces are regarded as being negligible, the vertical components of forces and moments acting on the knee joints of the legs can be obtained as below. They are obtained based on the vertical components of the ground reaction forces obtained in such a way as mentioned above, points of application of the ground reaction forces obtained based on attitude of the legs and the like and terms of the acceleration of gravity. The vertical components of forces and moments acting on the hip joint can be obtained based on the vertical components of forces and moments acting on the knee joints of the legs and the term of the acceleration of gravity. Further, based on moments acting on the knee joints and the hip joint of the legs, torques such as assist torques to be applied to the knee joints and the hip joint of the legs in human assist systems, can be obtained. Thus, control of human assist systems for assisting human operations can be realized.

Based on the above description, the present invention will be described below. A method for obtaining torques to be applied to joints of a leg of a biped walking system, according to the present invention comprises the step of determining which leg or legs are in contact with the ground. The method further comprises the steps of obtaining the vertical component of a ground reaction force acting on the leg, based on which leg or legs are in contact with the ground and obtaining a point of application of the ground reaction force. The method further comprises the step of obtaining moments acting around the joints of the leg, using the vertical component of the ground reaction force acting on the leg at the point of application of the ground reaction force, the vertical components of forces acting on the joints of the leg and a term of the acceleration of gravity and without using the horizontal components of the forces acting on the joints of the leg and a term of acceleration except the term of the acceleration of gravity. The method further comprises the step of obtaining the torques to be applied to the joints of the leg, based on the moments acting around the joints of the leg.

Thus, in the present invention, the vertical components alone of forces acting on the legs are used and the horizontal components are not used. Accordingly, errors in measurement of forces in the horizontal direction, that is, accelerations in the horizontal direction do not cause errors in joint moments. Further, as forces in the vertical direction, forces caused by gravity alone are used. Accordingly, errors in measurement of forces in the vertical direction do not cause errors in joint moments.

Further, since the present invention does not need an acceleration of each portion of the leg except the acceleration of gravity, noises are reduced and an operation speed is increased. Accordingly, robust and real-time operations can be easily achieved in obtaining moments acting around joints of the legs of the biped walking system.

According to an embodiment of the present invention, in a single-support mode the vertical component of the ground reaction force acting on the leg is assumed to be M·g and in a double-support mode the vertical component of the ground reaction force acting on each of the legs is assumed to be (½)·M·g, where M is a weight of a person and g is the acceleration of gravity. Accordingly, the vertical component of the ground reaction force acting on the leg or legs can be easily obtained, and robust and real-time operations can be still easily achieved.

According to an embodiment of the present invention, in the step of determining which leg or legs are in contact with the ground, the determination is made based on a value of the vertical component of acceleration measured on the body. Thus, complicated processes for the determination are not required and therefore an operation speed is further increased. Accordingly, real-time operations can be still easily achieved in control of human assist systems for assisting human operations and the like.

According to another embodiment of the present invention, in the step of determining which leg or legs are in contact with the ground, the determination is made using a sensor. Thus, operations for the determination are not required and therefore real-time operations can be still easily achieved in control of human assist systems for assisting human operations and the like. Further, the determination is made with reliability based on the simple sensor.

According to another embodiment of the present invention, in the step of obtaining a point of application of the ground reaction force, the point is obtained based on the attitude of the leg and a location of the center of gravity of the body. Accordingly, robust operations can be achieved with a simple method.

According to another embodiment of the present invention, in the step of obtaining a point of application of the ground reaction force, the point is obtained further using information from a sensor. Accordingly, the point is obtained with reliability based on information form the sensor.

According to another embodiment of the present invention, in the step of obtaining moments acting around the joints of the leg, at first the vertical component of a force acting on and a moment acting around the knee joint of the shin, are obtained using the vertical component of the ground reaction force acting on the shin at the point of application of the ground reaction force and a term of the acceleration of gravity and without using the horizontal component of the ground reaction force and a term of acceleration except the term of the acceleration of gravity. Then the vertical component of a force acting on and a moment acting around the hip joint of the thigh, are obtained using the vertical component of a force acting on and a moment acting around the knee joint of the thigh and a term of the acceleration of gravity and without using the horizontal component of the horizontal component of the force acting on the knee joint and a term of acceleration except the term of the acceleration of gravity.

Accordingly, a moment acting around the knee joint of the shin and a moment acting around the hip joint of the thigh can be obtained with reliability, using the ground reaction force acting on the leg at the point of application of the ground reaction force and a term of the acceleration of gravity alone.

A method for obtaining moments acting around joints of a leg of a biped walking system, according to the present invention comprises the step of determining which leg or legs are in contact with the ground. The method further comprises the steps of obtaining the vertical component of a ground reaction force acting on the leg, based on which leg or legs are in contact with the ground and obtaining a point of application of the ground reaction force. The method further comprises the step of obtaining moments acting around the joints of the leg, using the vertical component of the ground reaction force acting on the leg at the point of application of the ground reaction force, the vertical components of forces acting on the joints of the leg and a term of the acceleration of gravity and without using the horizontal components of the forces acting on the joints of the leg and a term of acceleration except the term of the acceleration of gravity.

Thus, in the present invention, the vertical components alone of forces acting on the legs are used and the horizontal components are not used. Accordingly, errors in measurement of forces in the horizontal direction, that is, accelerations in the horizontal direction do not cause errors in joint moments. Further, as forces in the vertical direction, forces caused by gravity alone are used. Accordingly, errors in measurement of forces in the vertical direction do not cause errors in joint moments.

Further, since the present invention does not need an acceleration of each portion of the leg, noises are reduced and an operation speed is increased. Accordingly, robust and real-time operations can be easily achieved in obtaining moments acting around joints of the legs of the biped walking system.

A processor for obtaining torques to be applied to joints of a leg of a biped walking system, according to the present invention, is operable in association with angular sensors on the joints and at least one sensor set on the body of the biped walking system. The processor is configured to perform the following steps. The steps include determining which leg or legs are in contact with the ground, using information from the at least one sensor set on the body and obtaining an attitude of the leg, using information from the angular sensors. The steps further include obtaining a location of the center of gravity of the whole body including the leg and obtaining the vertical component of a ground reaction force acting on the leg, based on which leg or legs are in contact with the ground. The steps further include obtaining a point of application of the ground reaction force, using the attitude of the leg and the location of the center of gravity of the whole body. The steps further include obtaining moments acting around the joints of the leg, using the vertical component of the ground reaction force acting on the leg at the point of application of the ground reaction force, the vertical components of forces acting on the joints of the leg and a term of the acceleration of gravity and without using the horizontal components of the forces acting on the joints of the leg and a term of acceleration except the term of the acceleration of gravity. The steps further include obtaining the torques to be applied to the joints of the leg, based on the moments acting around the joints of the leg.

A processor for obtaining torques to be applied to joints of a leg of a biped walking system, according to the present invention, is operable in association with angular sensors on the joints, at least one sensor set on the body of the biped walking system and at least one sensor set on the leg. The processor is configured to perform the following steps. The steps include determining which leg or legs are in contact with the ground, using information from the at least one sensor set on the leg and obtaining an attitude of the leg, using information from the angular sensors. The steps further include obtaining a location of the center of gravity of the whole body including the leg, and obtaining the vertical component of a ground reaction force acting on the leg, based on which leg or legs are in contact with the ground. The steps further include obtaining a point of application of the ground reaction force, using the attitude of the leg and the location of the center of gravity of the whole body. The steps further include obtaining moments acting around the joints of the leg, using the vertical component of the ground reaction force acting on the leg at the point of application of the ground reaction force, the vertical components of forces acting on the joints of the leg and a term of the acceleration of gravity and without using the horizontal components of the forces acting on the joints of the leg and a term of acceleration except the term of the acceleration of gravity. The steps further include obtaining the torques to be applied to the joints of the leg, based on the moments acting around the joints of the leg.

Thus, in the present invention, the vertical components alone of forces acting on the legs are used and the horizontal components are not used. Accordingly, errors in measurement of forces in the horizontal direction, that is, accelerations in the horizontal direction do not cause errors in joint moments. Further, as forces in the vertical direction, forces caused by gravity alone are used. Accordingly, errors in measurement of forces in the vertical direction do not cause errors in joint moments.

Further, since the present invention does not need an acceleration of each portion of the leg except the acceleration of gravity, noises are reduced and an operation speed is increased. Accordingly, robust and real-time operations can be easily achieved in obtaining moments acting around joints of the legs of the biped walking system.

Further, in the invention in which information from the at least one sensor is used to determine which leg or legs are in contact with the ground, complicated processes for the determination are not required and therefore an operation speed is further increased. Accordingly, real-time operations can be still easily achieved in control of human assist systems for assisting human operations and the like.

In the invention in which information from the at least one sensor set on the leg is used to determine which leg or legs are in contact with the ground, operations for the determination are not required and therefore real-time operations can be still easily achieved in control of human assist systems for assisting human operations and the like. Further, the determination is made with reliability based on the simple sensor.

A processor for moments acting around joints of a leg of a biped walking system, according to the present invention, is operable in association with angular sensors on the joints and at least one sensor set on the body of the biped walking system. The processor is configured to perform the following steps. The steps include determining which leg or legs are in contact with the ground, using information from the at least one sensor set on the body and obtaining an attitude of the leg, using information from the angular sensors. The steps further include obtaining a location of the center of gravity of the whole body including the leg, and obtaining the vertical component of a ground reaction force acting on the leg, based on which leg or legs are in contact with the ground. The steps further include obtaining a point of application of the ground reaction force, using the attitude of the leg and the location of the center of gravity of the whole body. The steps further include obtaining the moments acting around the joints of the leg, using the vertical component of the ground reaction force acting on the leg at the point of application of the ground reaction force, the vertical components of forces acting on the joints of the leg and a term of the acceleration of gravity and without using the horizontal components of the forces acting on the joints of the leg and a term of acceleration except the term of the acceleration of gravity.

A processor for moments acting around joints of a leg of a biped walking system, according to the present invention, is operable in association with angular sensors on the joints, at least one sensor set on the body of the biped walking system and at least one sensor set on the leg. The processor is configured to perform the following steps. The steps include determining which leg or legs are in contact with the ground, using information from the at least one sensor set on the leg and obtaining an attitude of the leg, using information from the angular sensors. The steps further include obtaining a location of the center of gravity of the whole body including the leg, and obtaining the vertical component of a ground reaction force acting on the leg, based on which leg or legs are in contact with the ground. The steps further include obtaining a point of application of the ground reaction force, using the attitude of the leg and the location of the center of gravity of the whole body. The steps further include obtaining the moments acting around the joints of the leg, using the vertical component of the ground reaction force acting on the leg at the point of application of the ground reaction force, the vertical components of forces acting on the joints of the leg and a term of the acceleration of gravity and without using the horizontal components of the forces acting on the joints of the leg and a term of acceleration except the term of the acceleration of gravity.

Thus, in the present invention, the vertical components alone of forces acting on the legs are used and the horizontal components are not used. Accordingly, errors in measurement of forces in the horizontal direction, that is, accelerations in the horizontal direction do not cause errors in joint moments. Further, as forces in the vertical direction, forces caused by gravity alone are used. Accordingly, errors in measurement of forces in the vertical direction do not cause errors in joint moments.

Further, since the present invention does not need an acceleration of each portion of the leg except the acceleration of gravity, noises are reduced and an operation speed is increased. Accordingly, robust and real-time operations can be easily achieved in obtaining moments acting around joints of the legs of the biped walking system.

Further, in the invention in which information from the at least one accelerometer is used to determine which leg or legs are in contact with the ground, complicated processes for the determination are not required and therefore an operation speed is further increased. Accordingly, real-time operations can be still easily achieved in control of human assist systems for assisting human operations and the like.

In the invention in which information from the at least one sensor set on the leg is used to determine which leg or legs are in contact with the ground, operations for the determination are not required and therefore real-time operations can be still easily achieved in control of human assist systems for assisting human operations and the like. Further, the determination is made with reliability based on the sensor.

DESCRIPTION OF THE DRAWINGS

FIG. 1 illustrates a basic idea of a method of estimating a ground reaction force, according to the present invention.

DETAILED DESCRIPTION OF THE PREFERRED EMBODIMENTS

One embodiment of the present invention will be described referring to FIGS. 1 to 5.

In this embodiment a method for obtaining torques to be applied to joints and a method for estimating join moments, are applied to a person as a biped walking system.

Figure 2:
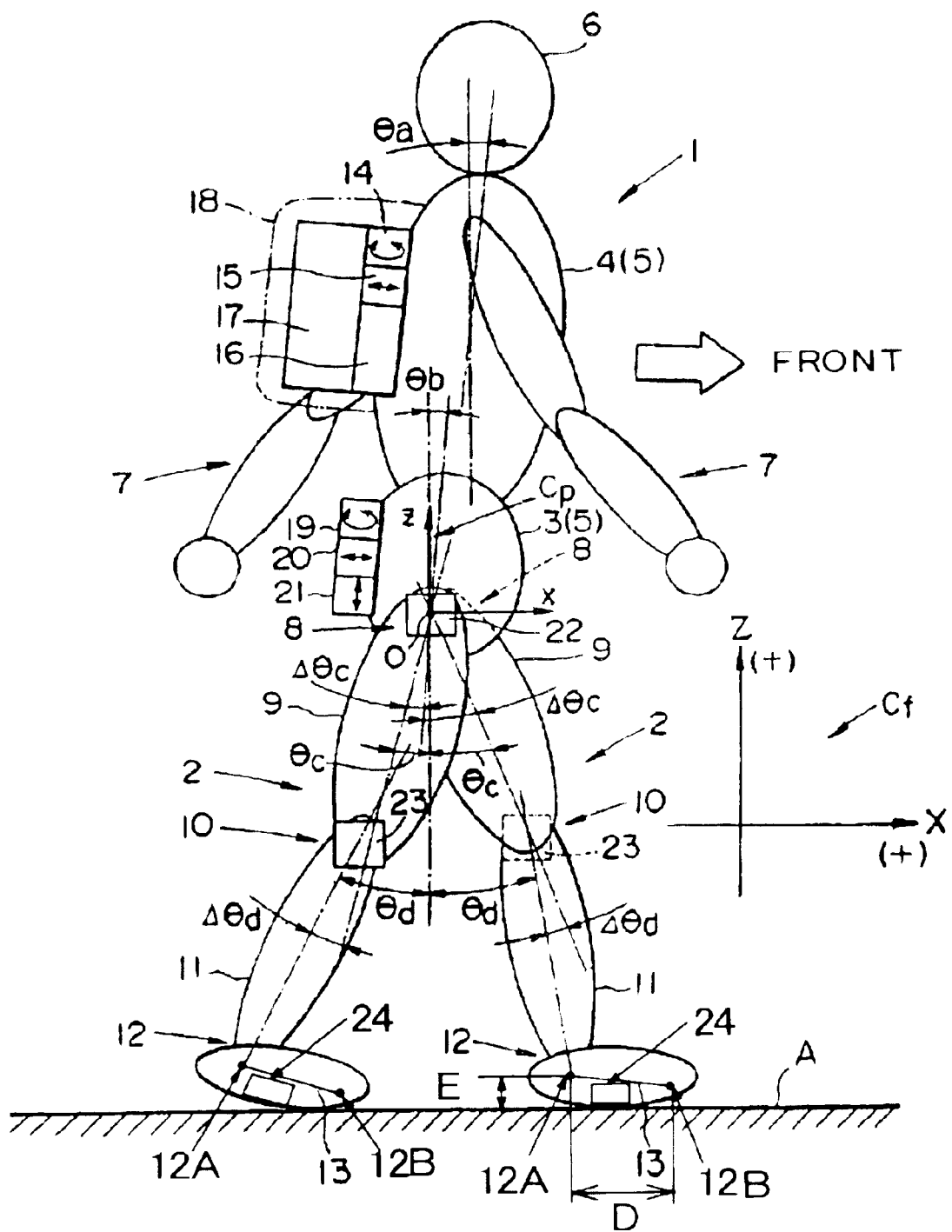
FIG. 2 shows in schematic form a person as a biped walking system and devices equipped with the person.

As illustrated in FIG. 2, a person (1) has a pair of legs (2, 2), a torso (5) comprising a hip (3) and a chest (4), a head (6) and a pair of arms (7, 7). In the torso (5) the hip (3) is connected with each of the legs (2, 2) through each of a pair of hip joints (8, 8) and is supported on the both legs (2, 2). The chest (4) is located over the hip (3) and can be declined toward the front of the person (1). The arms (7, 7) extend from the lateral sides of the upper portion of the chest (4), over which the head (6) is supported.

Each of the legs (2, 2) has a thigh (9) extending from one of the hip joints (8) and a shin (11) extending from the end of the thigh via a knee joint (10). The end of the shin (11) is connected with a foot (13) via an ankle (ankle joint) (12).

In this embodiment the person (1) is equipped with devices mentioned below in order to estimate a ground reaction force acting on each (2) of the legs of the person (1) and moments acting on each (10) of the knee joints and each (8) of the hip joints.

The chest (4) of the torso (5) is equipped with a gyroscopic sensor (14) (hereinafter referred to as a chest gyroscopic sensor (14)), an accelerometer (15) (hereinafter referred to as a chest horizontal accelerometer (15)), a processor (16) and a battery (17). The chest gyroscopic sensor (14) generates an output corresponding to an angular velocity caused by inclination of the chest. The chest horizontal accelerometer (15) generates an output corresponding to acceleration in the horizontal direction at the chest (4). The processor (16) comprises a CPU, a RAM, a ROM and other components. The battery (17) functions as power source for the processor (16) and other devices. In this case, the chest gyroscopic sensor (14), the chest horizontal accelerometer (15), the processor (16) and the battery (17) are accommodated in a container (18) like a shoulder bag, fixed to the chest (4) with a belt or the like not shown in the drawings and thus integrally fixed to the chest (4).

In more detail, output of the chest horizontal accelerometer (15) is acceleration in the anteroposterior direction in the horizontal cross section of the chest (4) (orthogonal to the axis of the chest (4)). So, when the person (1) stands in an upright posture on the level ground, the acceleration is that in the horizontal direction (the direction of the x-axis of the absolute coordinate system shown in FIG. 2). However, when the chest (4) is inclined from the vertical direction (the direction of the z-axis of the absolute coordinate system shown in FIG. 2), the acceleration is that in the direction inclined by the angle by which the chest (4) is inclined from the vertical direction.

Further, the hip (3) of the torso (5) is equipped with a gyroscopic sensor (19) (hereinafter referred to as a hip gyroscopic sensor (19)), an accelerometer (20) for generating an output corresponding to acceleration in the horizontal direction at the hip (3) (hereinafter referred to as a hip horizontal accelerometer (20)) and another accelerometer (21) for generating an output corresponding to acceleration in the vertical direction at the hip (3) (hereinafter referred to as a hip vertical accelerometer (21)). The hip gyroscopic sensor (19) generates an output corresponding to an angular velocity caused by inclination of the hip. The above sensors are integrally fixed to the hip (3) with fixing means such as a belt or the like not shown in the drawings.

In more detail, as in the case of the chest horizontal accelerometer (15), the hip horizontal accelerometer (20) detects acceleration in the anteroposterior direction in the horizontal cross section of the hip (3) (orthogonal to the axis of the hip (3)). Further, in more detail, the hip vertical accelerometer (21) detects acceleration in the direction of the axis of the hip (3) (, which is orthogonal to the direction of acceleration detected by the hip horizontal accelerometer (20)). The hip horizontal accelerometer (20) and the hip vertical accelerometer (21) may be an integral biaxial accelerometer.

The hip joint (8) and knee joint (10) of each (2) of the legs are equipped respectively with a hip joint angular sensor (22) generating an output corresponding to a bending angle $\Delta\theta c$ and a knee joint angular sensor (23) generating an output corresponding to a bending angle $\Delta\theta d$. Although FIG. 2 shows the hip joint angular sensor (22) concerning the hip joint (8) of the leg (2) on the right side of the person (1), alone, the hip joint (8) of the leg (2) on the left side of the person (1) is equipped with another hip joint angular sensor (22) just as in the case of the right side.

The angular sensors (22, 23) comprise potentiometers, for example, and are attached to each (2) of the legs by such means as a band not shown in the drawing. In more detail, a bending angle $\Delta\theta c$ detected by each (22) of the hip joint angular sensors is a rotation angle around the hip joint (8) (around the lateral axis of the hip joint (8)) of the thigh (9) of each of the legs with respect to the hip (3). The reference angle is the rotation angle measured when the hip (3) is in proper relation with each (2) of the legs. For example, the reference angle is the rotation angle measured when the axis of the hip (3) and the axis of the thigh (9) are substantially parallel to each other as in the case that the person (1) is in an upright posture. Similarly, a bending angle $\Delta\theta d$ detected by each (23) of the knee joint angular sensors is a rotation angle around the knee joint (10) (around the lateral axis of the hip knee joint (10)) of the shin (11) of each of the legs with respect to the thigh (9). The reference angle is the rotation angle measured when the thigh (9) is in proper relation with the shin (11). For example, the reference angle is the rotation angle measured when the axis of the thigh (9) and the axis of the shin (11) are substantially parallel to each other.

One or more foot switches (24) may be provided with portions of the legs, to be in contact with the ground. Foot switches (24) detect which leg or legs are in contact with the ground, with a contact method.

Alternatively, range sensors with an infrared method or the like, not shown in the drawings may be attached to the ankle joints or the knee joints. In this case, distances to the floor have been previously measured in an upright posture. Based on the previously measured distances and distances measured by the sensors in walking, it is determined which leg or legs are in contact with the ground.

The sensors (14, 15 and 19 to 24) and the range sensors not shown in the drawings, are connected with the processor (16) via signal lines not shown in the drawings to deliver their outputs to the processor (16).

Figure 3:
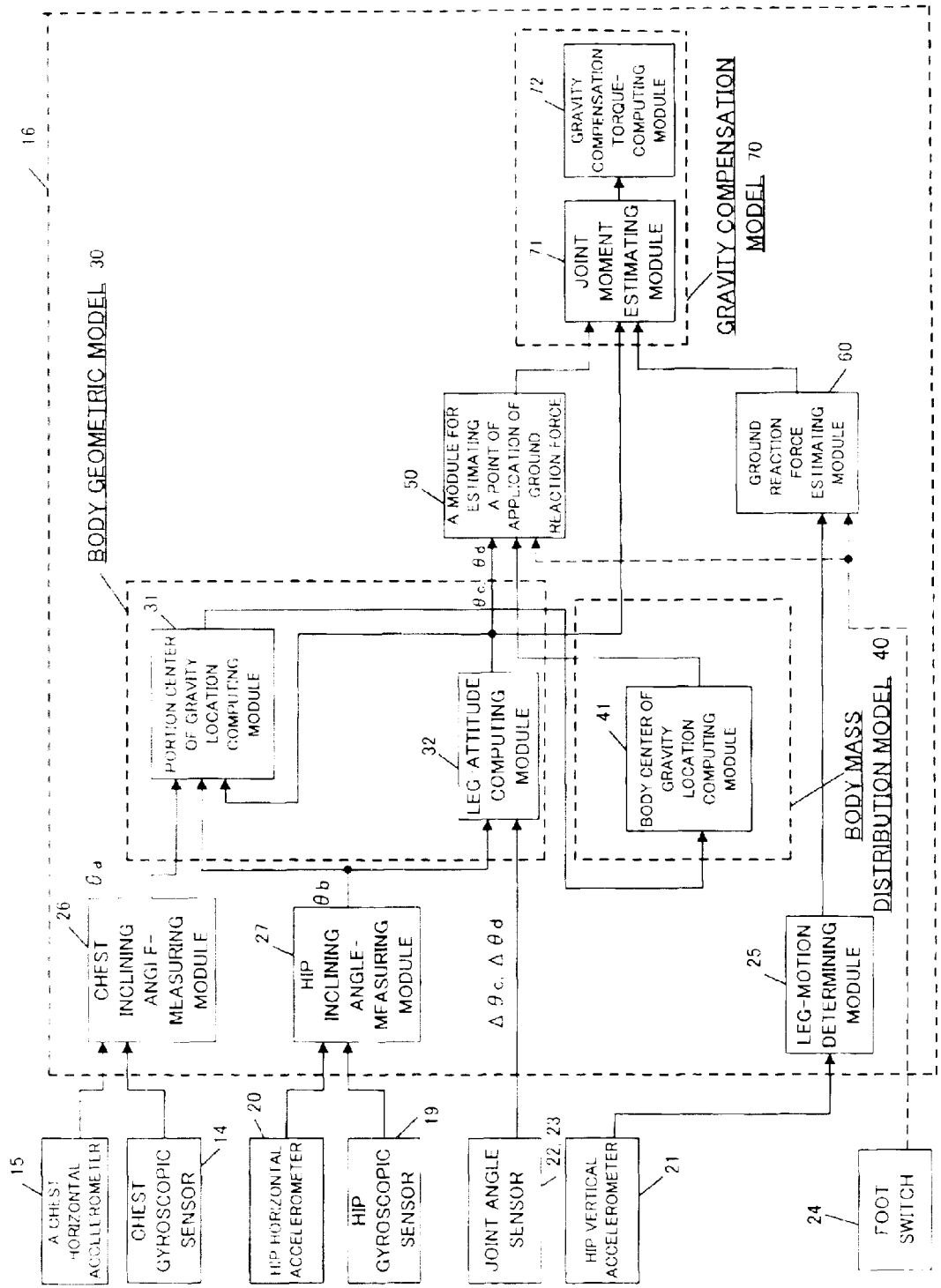
FIG. 3 illustrates functions of a processor included in the devices.

The processor (16) is provided with functional modules as shown in FIG. 3. The processor (16) may be provided with a leg-motion determining module (25). The leg-motion determining module (25) determines whether the legs (2, 2) of the person (1) are in a single-support phase (as shown in FIG. 1(a)) or in a double-support phase (as shown in FIG.

1(b)), using data detected by the hip vertical accelerometer (21) and predetermined thresholds. Alternatively, foot switches (24) on portions to be in contact with the ground or range sensors not shown in the drawings, may be provided so that information from the foot switches (24) or the range sensors can be used to determine which leg or legs are in contact with the ground. Further, the processor (16) is provided with a chest inclining angle-measuring module (26) and a hip inclining angle-measuring module (27). The chest inclining angle-measuring module (26) measures an inclining angle θa of the chest (4) (more specifically, for example, an inclining angle θa from the vertical direction as shown in FIG. 2) in the absolute coordinate system Cf, using data detected by the chest horizontal accelerometer (15) and chest gyroscopic sensor (14). The hip inclining angle-measuring module (27) measures an inclining angle θb of the hip (3) (more specifically, for example, an inclining angle θb from the vertical direction as shown in FIG. 2) in the absolute coordinate system Cf, using data detected by the hip horizontal accelerometer (20) and hip gyroscopic sensor (19).

Further, the processor (16) is provided with a reference-acceleration measuring module (28). The reference acceleration measuring module (28) obtains the vertical component $a_oz$ of (translational) acceleration of the origin point O in the body coordinate system Cp (xz coordinates in FIG. 2), using data detected by the hip horizontal accelerometer (20) and the hip vertical accelerometer (21) and an inclining angle θb of the hip (3) detected by the hip inclining angle-measuring module (27). The body coordinate system Cp (xz coordinates in FIG. 2) is fixed to the hip (3) as the reference point of the person (1) in this embodiment, as shown in FIG. 2. In more detail, the body coordinate system Cp has its origin point O at the middle point of the line segment connecting the centers of the right and left hip joints (8, 8) of the person (1), its z axis in the vertical direction and its x axis in the moving direction of the person (1) in the horizontal plane. The directions of the three axes of the body coordinate system Cp are identical with those of the absolute coordinate system Cf.

The processor (16) is provided with a leg-attitude computing module (32). The module (32) obtains an inclining angle θc of the thigh (9) of each (2) of the legs and an inclining angle θd of the shin (11) of each (2) of the legs in the absolute coordinate system Cf. More specifically, for example, the inclining angles are those from the vertical direction, as shown in FIG. 2. The module (32) obtains the inclining angles, using data detected by the hip joint angular sensor (22) and knee joint angular sensor (23) of each of the legs and an inclining angle θb of the hip (3) measure by the hip inclining angle-measuring module (27).

The processor (16) is provided with a portion center of gravity-location computing module (31). The module (31) obtains locations of the centers of gravity of portions of the person (1) corresponding to rigid segments of a rigid body linked segment model mentioned below (in more detail which leg or legs, locations of the centers of gravity of portions corresponding to rigid segments, in the body coordinate system Cp mentioned above). The module (31) obtains the locations of the centers of gravity, using an inclining angle θa of the chest (4) measured by the chest inclining angle-measuring module (26), an inclining angle θb of the hip (3) measured by the hip inclining angle-measuring module (27) and an inclining angle θc of the thigh (9) of each (2) of the legs and an inclining angle θd of the shin (11) of each (2) of the legs, obtained by the leg-attitude computing module (32).

The portion center of gravity-location computing module (31) and leg-attitude computing module (32) constitute a body geometric model (30).

Further, the processor (16) is provided with a body center of gravity location computing module (41) and a body center of gravity-acceleration computing module (42). The module (41) obtains the center of gravity of the whole person (1) in the body coordinate system Cp, using locations of the centers of gravity of portions corresponding to rigid segments. The center of gravity-acceleration computing module (42) obtains vertical component az of acceleration of the body center of gravity G0 in the body coordinate system Cp (shown in FIG. 1).

The body center of gravity location computing module (41) and center of gravity-acceleration computing module (42) constitute a body mass distribution model (40).

The processor (16) is provided with a module (50) for estimating a point of application of ground reaction force. The module (50) locates a point of application of ground reaction force acting on a leg in contact with the ground. The module (50) locates the point, using an inclining angle θc of the thigh (9) and an inclining angle θd of the shin (11) obtained by the leg-attitude computing module (32) and the center of gravity of the whole obtained by the body center of gravity location computing module (41). Alternatively, information from foot switches (24) or range sensors not shown in the drawings can be used to estimate a point of application of ground reaction force, as mentioned in more detail below.

The processor (16) is provided with a ground reaction-force estimating module (60) for obtaining a ground reaction force acting on each (2) of the legs. The ground reaction-force estimating module (60) obtains a location of the ankle (12) of each (2) of the legs, as a specific part of each (2) of the legs, with respect to the center of gravity of the whole body G0 (hereinafter referred to as body center of gravity G0). In more detail, the location is represented by (ΔXf, ΔZf) or (ΔXr, ΔZr) in Equation (5). The module (60) obtains the location, using a location of the body center of gravity G0, obtained by the body center of gravity location computing module (41) and inclining angles θc of the thigh (9) and θd of the shin (11) of each (2) of the legs, obtained by the leg-attitude computing module (32). Further, the module (60) obtains an estimated value of the vertical component of the ground reaction force acting on each (2) of the legs, using the location, the vertical component az of acceleration of the body center of gravity and state of which leg or legs are in contact with the ground, determined by the leg-motion determining module (25). The vertical component az is obtained by the center of gravity-acceleration computing module (42).

The processor (16) is provided with a joint moment estimating module (71) for estimating moments acting on the knee joint (10) and the hip joint (8) of each of the legs. The module (71) estimates moments, using a value estimated by the ground reaction-force estimating module (60), a location estimated by the module (50) for estimating a point of application of ground reaction force and inclining angles θc and θd of the thigh (9) and the shin (11) of each (2) of the legs, obtained by the leg-attitude computing module (32).

The processor (16) is provided with a gravity compensation torque-computing module (72) for obtaining assist torque for assisting the person, that is, gravity compensation torques by multiplying estimated values of moments obtained by the joint moment estimating module (71), by certain factors.

The joint moment estimating module (71) and gravity compensation torque-computing module (72) constitute a gravity compensation model (70).

Operations of this embodiment carried out by the modules of the processor (16) will be described in detail below.

In this embodiment the processor (16) starts to carry out the following successive operations periodically to obtain an estimated value of the ground reaction force acting on each (2) of the legs or the like, when the person (1) with his or her legs (2, 2) being in contact with the ground, turns on the power switch of the processor (16) not shown in the drawings, before he or she starts moving his or her legs, for example walking.

First, the processor (16) has the leg-motion determining module (25) carry out processes. In the processes of the leg-motion determining module (25), an acceleration value at the hip (3) in the upward and vertical direction, detected by the hip vertical accelerometer (21), is compared with a predetermined threshold periodically. When the detected acceleration value exceeds the threshold, it is determined that the motion is in a single-support phase in which the front leg is in contact with the ground as shown in FIG. 1(a). When the detected acceleration value is less than or equal to the threshold, it is determined that the motion is in a double-support phase as shown in FIG. 1(b).

Alternatively, outputs of the foot switches (24) provided on portions of the legs to be in contact with the ground or the range sensors not shown in the drawings, are read periodically to determine which leg or legs are in contact with the ground.

Concurrently with the above-mentioned processes of the foot switches (24) or the range sensors, or of the leg-motion determining module (25), the processor (16) carries out processes of the chest inclining angle-measuring module (26) and hip inclining angle-measuring module (27). In the processes of the chest inclining angle-measuring module (26), an inclining angle θa of the chest (4) in the absolute coordinate system Cf is successively obtained by processing data of acceleration in the horizontal direction detected by the chest horizontal accelerometer (15) and data of angular velocity detected by the chest gyroscopic sensor (14), with a known method using Karman filter. Similarly, in the processes of the hip inclining angle-measuring module (27), an inclining angle θb of the hip (3) in the absolute coordinate system Cf is successively obtained by processing data of acceleration in the horizontal direction detected by the hip horizontal accelerometer (20) and data of angular velocity detected by the hip gyroscopic sensor (19), with a known method using Karman filter. In this embodiment, for example, an inclining angle θa of the chest (4) and an inclining angle θb of the hip (3) in the absolute coordinate system Cf, are those from the vertical direction (the direction of gravity).

An inclining angle of the chest (4) and an inclining angle of the hip (3) can also be obtained by integrating data of angular velocities detected by gyroscopic sensors (14) and (19), for example. However, the method using Karman filter in this embodiment enables more accurate measurements of an inclining angle θa of the chest (4) and an inclining angle θb of the hip (3).

Next the processor (16) carries out processes of the leg-attitude computing module (32) and reference-acceleration measuring module (28).

In the processes of the leg-attitude computing module (32), an inclining angle θc of the thigh (9) of each (2) of the legs and an inclining angle θd of the shin (11) of each (2) of the legs in the absolute coordinate system Cf, are periodically obtained as below. Inclining angles are those from the vertical direction as shown in FIG. 2. An inclining angle θc of the thigh (9) of each (2) of the legs, is obtained by substituting a current value of bending angle Δθc of the hip joint (8) detected by the hip joint angular sensor (22) and a current value of inclining angle θb of the hip (3), obtained by the hip inclining angle-measuring module (27), into the following equation.

$$\theta c = \theta b + \Delta\theta c \qquad (5)$$

A value of inclining angle θb of the hip (3) becomes negative when the hip (3) is inclined from the vertical direction in such away as the top end of the hip (3) is located forward than the bottom end, toward the front of the person (1). A value of bending angle Δθc becomes positive when the thigh (9) is inclined in such away as the bottom end of the thigh (9) is located toward the front of the person (1).

An inclining angle θd of the shin (11) of each (2) of the legs is obtained by substituting a current value of inclining angle θc of the thigh (9) previously obtained as mentioned above and a current value of bending angle Δθd detected by knee joint angular sensor (23) attached to the leg, into the following equation.

$$\theta d = \theta c - \Delta\theta d \qquad (6)$$

A value of bending angle at the knee joint (10) becomes positive when the shin (11) is inclined from the axis of the thigh (9) toward the back.

Next the processor (16) carries out processes of the portion center of gravity-location computing module (31) to obtain locations of the centers of gravity in the body coordinate system Cp, of portions of the person (1) corresponding to rigid segments, using a rigid body linked segment model mentioned below.

Figure 4:
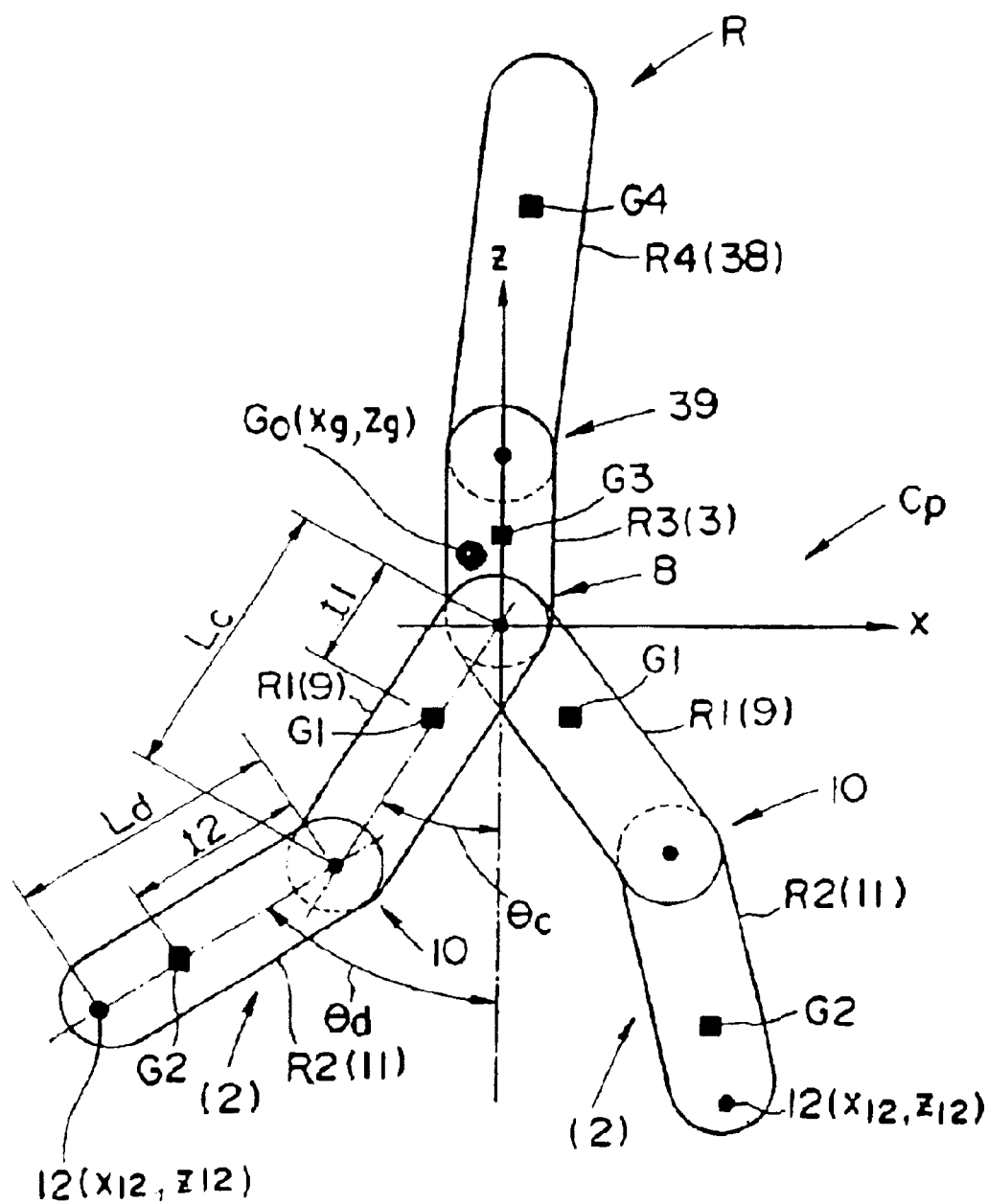
FIG. 4 shows a rigid body linked segment model used in operations of the processor shown in FIG. 3.

As shown in FIG. 4, a rigid body linked segment model R used in this embodiment represents the person (1) as a combination of rigid bodies (R1, R1) corresponding to the thighs (9, 9) of the legs, rigid bodies (R2, R2) corresponding to the shins (11, 11) of the legs, a rigid body R3 corresponding to the hip (3) and a rigid body R4 corresponding to a portion (38) comprising the chest (4), the arms (7, 7) and the head (6). The portion is hereinafter referred to as the upper part (38). A coupler between R1 and R3 and that between R1 and R2 correspond respectively to one (8) of the hip joints and one (10) of the knee joints. By a portion corresponding to a coupler between R3 and R4, the hip (3) supports the chest (4) inclinably.

In this embodiment locations of the centers of gravity G1, G2, G3 and G4 of the portions (the thighs (9, 9) and the shins (11, 11) of the legs, the hip (3) and the upper part (38)) corresponding to rigid segments R1 to R4 in the rigid body linked segment model R, are previously obtained and stored in a memory connected to the processor (16), not shown in the drawings.

Locations of the centers of gravity G1, G2, G3 and G4 of the portions, stored in the processor (16), are those in a coordinate system fixed to each of the portions. In this case, a distance from the center of the joint at an end of a portion measured in the axial direction, is used to represent each of the locations of the centers of gravity G1, G2, G3 and G4 of the portions. For example, as shown in FIG. 4, a location of the center of gravity of one (9) of the thigh is represented by a distance t1 from the center of the hip joint (8) of the thigh (9) in the axial direction of the thigh (9). A location of the center of gravity of one (11) of the shin is represented by a distance t2 from the center of the knee joint (10) of the shin (11) in the axial direction of the shin (11). Values of distance t1 and distance t2 are previously stored in the processor (16). Locations of the centers of gravity G3 and G4 of the other portions are represented similarly.

Strictly speaking, motions of the arms (7, 7) affect a location of the center of gravity G4 of the upper part (38). However, in walking locations of the arms (7, 7) are generally symmetric with respect to the axis of the chest (4) and therefore a location of the center of gravity G4 of the upper part (38) does not change significantly, remaining substantially identical with that in an upright posture, for example.

Further, in this embodiment, other data of the portions (the thighs (9, 9) and the shins (11, 11) of the legs, the hip (3) and the upper part (38)), including weights and sizes (for example, lengths) besides locations of the centers of gravity G1, G2, G3 and G4, are previously obtained and stored in the processor (16).

A weight of one (11) of the shins includes that of corresponding one (13) of the feet. Data stored previously in the processor (16) may be obtained through actual measurements, or may be estimated through a height and a weight of the person (1) based on average values obtained from statistical data of persons. Generally, locations of the centers of gravity G1, G2, G3 and G4, weights and sizes of the portions show a correlation with heights and weights of persons. Accordingly, locations of the centers of gravity G1, G2, G3 and G4, weights and sizes of the portions can be estimated based on data of a height and a weight of a person with a relatively high accuracy.

The portion center of gravity-location computing module (31) obtains locations of the centers of gravity G1, G2, G3 and G4 of the portions corresponding to rigid segments in the body coordinate system Cp (xz coordinates in FIG. 2) fixed to the hip (3) and having the origin point O, from the following data. The data include those previously stored in the processor (16) as mentioned above, current values of an inclining angle $\theta a$ of the chest (4) and an inclining angle $\theta b$ of the hip (3) and current values of an inclining angle $\theta c$ of the thigh (9) of each (2) of the legs and an inclining angle $\theta d$ of the shin (11) of each (2) of the legs. An inclining angle $\theta a$ of the chest (4) (an inclining angle of the upper part (38)) and an inclining angle $\theta b$ of the hip (3) are obtained respectively by the chest inclining angle-measuring module (26) and hip inclining angle-measuring module (27). An inclining angle $\theta c$ of the thigh (9) and an inclining angle $\theta d$ of the shin (11) are obtained by the leg-attitude computing module (32).

Since inclining angles $\theta a$ to $\theta d$ of each of the portions corresponding to rigid segments (the thigh (9) and the shin (11) of each (2) of the legs, the hip (3), and the upper part (38)) are obtained as mentioned above, locations and attitudes of the portions corresponding to rigid segments can be determined in the body coordinate system Cp. Accordingly, locations of the centers of gravity G1, G2, G3 and G4 of the portions corresponding to rigid segments can be obtained.

More specifically, for example, in FIG. 4 an inclining angle (from the z axis direction) of the thigh (9) of the leg (2) on the left side is $\theta c$. In FIG. 4, $\theta c$ is less than zero. Accordingly, coordinates of the location of the center of gravity G1 of the thigh (9) in the body coordinate system Cp are (t1·sin $\theta c$, −t1·cos $\theta c$). Further, an inclining angle of the shin (11) of the leg (2) on the left side is $\theta d$. In FIG. 4, $\theta d$ is less than zero. Accordingly, provided that a length of the thigh (9) is Lc, coordinates of the location of the center of gravity G2 of the shin (11) in the body coordinate system Cp are (Lc·sin $\theta c$+t2·sin $\theta d$, −Lc·cos $\theta c$−t2·cos $\theta d$). Locations of the centers of gravity of the thigh (9) and the shin (11) of the other leg (2), the hip (3) and the upper part (38) can be obtained in a similar way as mentioned above.

After the portion center of gravity-location computing module (31) has obtained locations of the centers of gravity G1, G2, G3 and G4 of the portions corresponding to rigid segments in the body coordinate system Cp, the processor (16) carries out operations of the body center of gravity location computing module (41). The body center of gravity location computing module (41) obtains a location (xg, zg) of the body center of gravity G0 of the person (1), using location data of G1, G2, G3 and G4 and weight data of the portions corresponding to rigid segments.

In the body coordinate system Cp, a location of the center of gravity G3 and a weight of the hip (3) are represented respectively by (x3, z3) and m3. A location of the center of gravity G4 and a weight of the upper part (38) are represented respectively by (x4, z4) and m4. A location of the center of gravity G1 and a weight of the thigh (9) of the leg (2) on the left side of the person (1) are represented respectively by (x1L, z1L) and m1L. A location of the center of gravity G2 and a weight of the shin (11) of the leg (2) on the left side of the person (1) are represented respectively by (x2L, z2L) and m2L. A location of the center of gravity G1 and a weight of the thigh (9) of the leg (2) on the right side of the person (1) are represented respectively by (x1R, z1R) and m1R. A location of the center of gravity G2 and a weight of the shin (11) of the leg (2) on the rioght side of the person (1) are represented respectively by (x2R, z2R) and m2R. A weight of the person (1) is represented by M (=m1L+m2L+m1R+m2R+m3+m4). Then, a location of the body center of gravity G0 of the person (1) is obtained by the following equation (7).

$$xg = (m1L \cdot x1L + m1R \cdot x1R + 2mL \cdot x2L + m2R \cdot x2R + m3 \cdot x3 + m4 \cdot x4)/M \quad (7)$$

$$zg = (m1L \cdot z1L + m1R \cdot z1R + m2L \cdot z2L + m2R \cdot z2R + m3 \cdot z3 + m4 \cdot z4)/M$$

Then the processor (16) carries out operations of the ground reaction-force estimating module (60) as below.

When it is determined during a current period through the leg-motion determining module (25), foot switches (24) or range sensors not shown in the drawings that motion of the legs are in a single-support phase, an estimated value of the vertical component Fz of the ground reaction force acting on the leg (2) in contact with the ground, is obtained using Equation (2).

In the above case, the vertical component Fz of the ground reaction force acting on the leg (2) not in contact with the ground (the leg without load), is zero.

When it is determined during a current period through the leg-motion determining module (25), foot switches (24) or range sensors not shown in the drawings that motion of the legs are in a double-support phase, estimated values of the vertical components Ffz and Frz of the ground reaction forces acting on each (2) of the legs, are obtained using Equation (4).

The processor (16) carries out operations of the module (50) for estimating a point of application of ground reaction force concurrently with the above operations of the body center of gravity location computing module (41) and the ground reaction-force estimating module (60).

In operations of the module (50) for estimating a point of application of ground reaction force, a vector from the ankle

(12) of each (2) of the legs to the point of application of the ground reaction force on the foot (13) of the leg, is obtained in the procedure below. The point of application of the ground reaction force is the point on which the whole ground reaction force acting on the portion of the foot (13), in contact with the ground, can be considered to be concentrated. The above vector is a location vector of the point of application of the ground reaction force, with respect to the ankle (12) and is hereinafter referred to as a vector of a point of application of the ground reaction force.

As shown in FIG. 2, the ankle joint at the ankle 12 is represented as 12A while the joint at the front end of the foot (13) (the so-called MP joint) is represented as 12B. First, the horizontal component x12 of coordinates of a location of the ankle joint (12A) is obtained. More specifically, in FIG. 4, provided that a length of the shin (11) (a length from the center of the knee joint (10) to the ankle (12)) of the leg on the left side of the drawing is Ld, coordinates (x12, z12) of location of the ankle (12) in the body coordinate system Cp are (Lc·sin θc+Ld·sin θd, −Lc·cos θc−Ld·cos θd). In FIG. 4, θc and θd are less than zero. Data on the other leg can be obtained similarly. Further, provided that a horizontal distance between the ankle joint (12A) and the MP joint (12B) is a constant D, the horizontal component x12B of coordinates of a location of the MP joint (12B) is obtained through the following equation.

$$X12B = x12 + D$$

Then walking mode is determined. If the vertical component of a difference between a location of the left ankle joint and that of the right ankle joint, as obtained in such a way as mentioned above, exceeds a certain threshold while the both legs are in contact with the ground, it is determined that the person (1) is going up or down stairs or going uphill or downhill. Otherwise, it is determined that the person (1) is walking under normal conditions.

Then when the person (1) is walking under normal conditions, the horizontal component of the endpoint of the vector of a point of application of the ground reaction force, is obtained by comparing the horizontal components obtained as mentioned above, in the following procedure. If the horizontal component xg of G0 is less than the horizontal component x12 of the ankle joint 12A, the horizontal component of the endpoint of the vector of a point of application of the ground reaction force is assumed to be the horizontal component x12 of the ankle joint 12A. If the horizontal component xg of G0 is between horizontal component x12 of the ankle joint 12A and the horizontal component x12B of the MP joint 12B, the horizontal component of the endpoint of the vector of a point of application of the ground reaction force is assumed to be the horizontal component xg of G0. If the horizontal component xg of G0 is greater than the horizontal component x12B of the MP joint 12B, the horizontal component of the endpoint of the vector of a point of application of the ground reaction force is assumed to be the horizontal component x12B of the MP joint 12B.

When the person (1) is going up or down stairs or going uphill or downhill, the horizontal component of the endpoint of the vector of a point of application of the ground reaction force is always assumed to be the horizontal component x12B of the MP joint (12B).

The vertical component of the vector of a point of application of the ground reaction force, is obtained with the assumption that a distance between the ankle joint 12A and the ground is a constant E.

In the above procedure, the vector of a point of application of the ground reaction force, can be obtained. The vector is starting at the ankle joint 12A and ending at the point of application of the ground reaction force.

Alternatively the module (50) for estimating a point of application of ground reaction force, can obtain the vector of a point of application of the ground reaction force, using information from the foot switches (24) or range sensors in the following procedure. In this case, the contact-type foot switches (24) or the range sensors for the ankle joints (12A) and the MP joints (12B) are used to determine whether or not each of the heels and each of tiptoes are in contact with the ground. If both foot switches (24) or both range sensors for the ankle joint (12A) and the MP joint (12B) indicate that the portions are in contact with the ground, the horizontal component of the vector of a point of application of the ground reaction force, is obtained in a similar procedure to that in the above case where the person (1) is walking under normal conditions. If the foot switch (24) or range sensor for the ankle joint (12A), alone indicates that the portion is in contact with the ground, the horizontal component of the endpoint of the vector of a point of application of the ground reaction force is assumed to be the horizontal component x12 of the location coordinates of the ankle joint (12A). If the foot switch (24) or range sensor for the MP joint (12B), alone indicates that the portion is in contact with the ground, the horizontal component of the endpoint of the vector of a point of application of the ground reaction force is assumed to be the horizontal component x12B of the location coordinates of the MP joint (12B).

The vertical component of the vector of a point of application of the ground reaction force, is obtained with the assumption that a distance between the ankle joint (12A) and the ground is a constant E.

In the above procedure, the vector of a point of application of the ground reaction force, can be obtained, using information from the foot switches (24) or range sensors. The vector is starting at the ankle joint 12A and ending at the point of application of the ground reaction force.

After having estimated the location of a point of application of the ground reaction force, the processor (16) caries out operations of the joint moment estimating module (71) to obtain moments acting on the knee joint (10) and the hip joint (8) of each (2) of the legs. The operations are carried out based on the so-called inverse dynamics model, using current values of data obtained by the ground reaction-force estimating module (60), module (50) for estimating a point of application of ground reaction force and leg-attitude computing module (32). The inverse dynamics model uses equations of translational motion and rotational motion for each portion of the person (1), corresponding to rigid segment, to obtain moments acting on the joints of each of the legs, one after another, from moment acting on the joint next to the point of application of ground reaction force. In this embodiment, moment acting on the knee joint (10) of each of the legs, is obtained and then that acting on the hip joint (8) is obtained.

In more detail, referring to FIG. 5, a force acting on the ankle (12) at an end of the shin (11) of each (2) of the legs (a joint reaction force), a force acting on the knee joint (10) of the shin (11) (a joint reaction force) and an translational acceleration of the center of gravity G2 of the shin (11) are represented by components in the absolute coordinate system Cf as below. The representations are $^T(F_1x, F_1z)$, $^T(F_2x, F_2z)$ and $^T(a_{2x}, a_{2z})$. A weight of the shin (11) is represented as $m_2$. If acceleration terms except the term of the acceleration of gravity are neglected, the equation of translational motion of the center of gravity G2 of the shin (11) is as below.

$$^T(0, 0) = {}^T(F_1x - F_2x, F_1z - F_2z - m_2 \cdot g)$$

Accordingly, as to the vertical components, the equation of motion is as below.

$$F_2z = F_1z - m_2 \cdot g \qquad (8)$$

An approximate value of the vertical component $F_1z$ of the joint reaction force acting on the ankle (12) at an end of the shin (11) is equal to an estimated value of the vertical component of the ground reaction force obtained by the ground reaction-force estimating module (60) for the shin (11) of the leg (2). In more detail, in a single-support phase the vertical component $F_1z$ of the joint reaction force is the vertical component $Fz=M \cdot g$ of the ground reaction force obtained through Equation (2) when the leg is in contact with the ground. The vertical component $F_1z$ is zero when the leg is idle. Further, in a double-support phase the vertical component $F_1z$ of the joint reaction force is the vertical component $Frz=(\frac{1}{2}) \cdot M \cdot g$ of the ground reaction force in Equation (4) when the leg is the rear one of the person (1) in the traveling direction. The vertical component $F_1z$ of the joint reaction force is the vertical component $Ffz=(\frac{1}{2}) \cdot M \cdot g$ of the ground reaction force in Equation (5) when the leg is the front one of the person (1) in the traveling direction.

Accordingly, the vertical component $F_2z$ of the joint reaction force acting on the knee joint (10) of each of the legs, can be obtained by substituting data of the vertical component $F_1z$ of the ground reaction force obtained by the ground reaction-force estimating module (60), data of a weight $m_2$ of the shin (11), previously obtained and a value of the acceleration of gravity g, into Equation (8).

Figure 5:
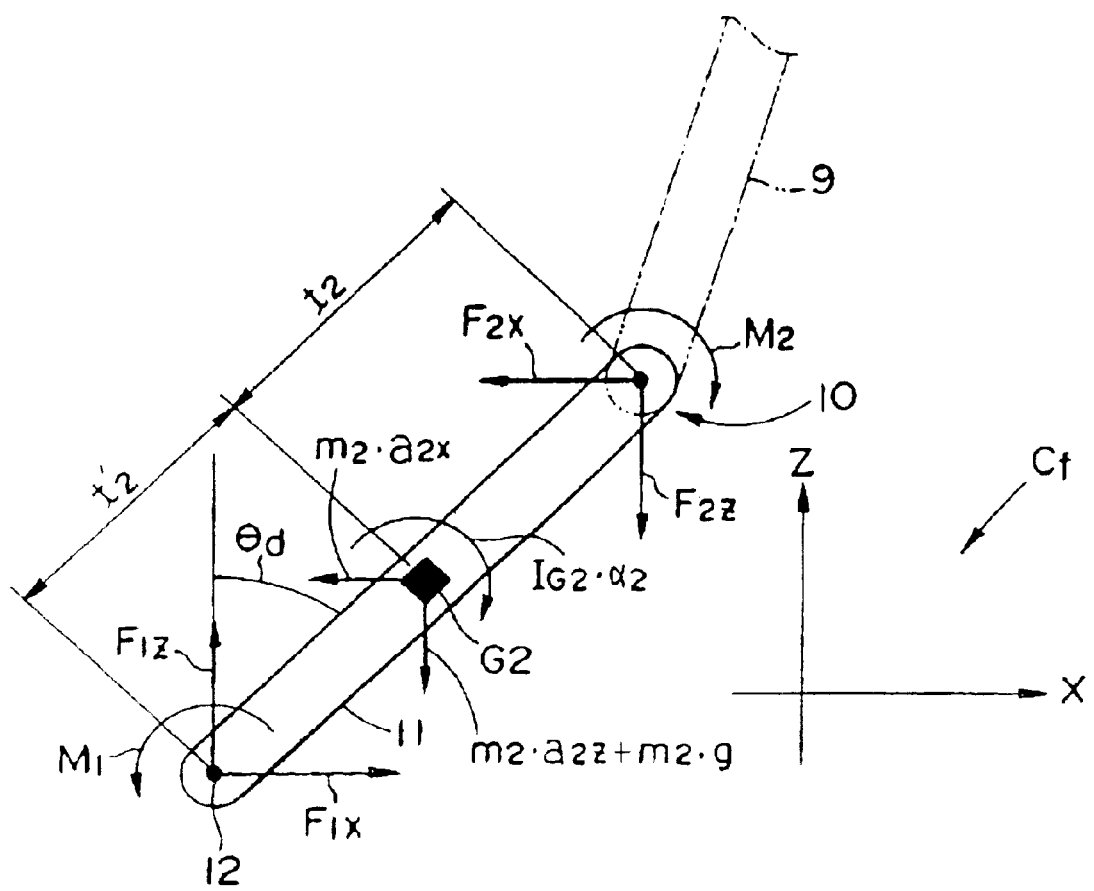
FIG. 5 illustrates operations performed by a joint moment estimating module in the processor, shown in FIG. 3.

Referring to FIG. 5, a moment acting on the ankle (12) at an end of the shin (11) of each (2) of the legs, a moment acting on the hip joint (10) of the shin (11), a moment of inertia around the center of gravity G2 of the shin (11) and an angular acceleration around the center of gravity G2 of the shin (11), are represented as $M_1$, $M_2$, $I_{G\ 2}$ and $\alpha_2$. Referring to FIG. 4, a distance between the center of gravity G2 of the shin (11) and the knee joint (10) and a distance between the center of gravity G2 of the shin (11) and the ankle (12) are represented respectively as $t_2$ and $t_2'$ (=Ld$-t_2$). If horizontal force terms and angular acceleration terms are removed, the equation of rotational motion around the center of gravity G2 of the shin (11) is as below.

$$I_{G2} \cdot \alpha_2 = 0 = M_1 - M_2 - F_1z \cdot t_2' \cdot \sin \theta d - F_2z \cdot t_2 \cdot \sin \theta d$$

The equation can be rewritten as below.

$$M_2 = M_1 - F_1z \cdot t_2' \cdot \sin \theta d - F_2z \cdot t_2 \cdot \sin \theta d \qquad (9)$$

$M_1$ in Equation (11) is a moment obtained as an outer (vector) product of a vector of a point of application of ground reaction force, obtained by the module (50) for estimating a point of application of ground reaction force and a vector of ground reaction force, obtained by the ground reaction-force estimating module (60). Further, since angular acceleration terms are removed, $\alpha_2$ is assumed to be zero. $\theta d$ is an inclining angle of the shin (11), obtained by the leg-attitude computing module (32). $F_1z$ is an estimated value of the vertical component of a ground reaction force, obtained by the ground reaction-force estimating module (60), as mentioned above. $F_2z$ is obtained through Equation (10).

Accordingly, moment $M_2$ acting on the knee joint (10) is obtained by substituting the following data into Equation (11). The data includes an estimated value of the vertical component of a ground reaction force, obtained by the ground reaction-force estimating module (60) and a vector of a point of application of ground reaction force, obtained by the module (50) for estimating a point of application of ground reaction force an inclining angle of the shin (11). The data further includes an inclining angle $\theta d$ of the shin (11), obtained by the leg-attitude computing module (32), the vertical component $F_2z$ of a joint reaction force, obtained through Equation (10), a size (d) of the shin (11) and a location ($t_2$) of the center of gravity G2.

The joint moment estimating module (71) obtains moment $M_2$ acting on the knee joint (10) of the shin (11) as mentioned above. Then the module obtains a moment acting on the hip joint (8) of the thigh (9) in a way similar to that mentioned above. The basic idea of the operation is identical with that for obtaining moment $M_2$ acting on the knee joint (10) and therefore detailed explanation with a drawing is not given. The outline of the operation is as below.

First, the vertical component $F_3z$ of the joint reaction force acting on the knee joint (8) of the thigh (9) is obtained through Equation (10) (which has the form identical with that of Equation (8)) on translational motion of the center of gravity G1 (FIG. 4) of the thigh (9).

$$F_3z = F_2z - m_1 \cdot g \qquad (10)$$

$F_2z$ is the vertical component of the joint reaction force on the knee joint (10), previously obtained through Equation (8). $m_1$ is a weight of the thigh (9) previously obtained and g is the acceleration of gravity.

Then, moment $M_3$ acting on the hip joint (8) of the thigh (9) is obtained through Equation (11) (which has the form identical with that of Equation (9)) on rotational motion of the center of gravity G1 of the thigh (9).

$$M_3 = M_2 - F_2z \cdot t_1 \cdot \sin \theta c - F_3z \cdot t_1 \cdot \sin \theta c \qquad (11)$$

$M_2$ is a moment on the knee joint (10), obtained through Equation (9). $F_2z$ is the vertical component of the joint reaction force on the knee joint (10), obtained through Equation (10). $F_3z$ is the vertical component of the joint reaction force on the hip joint (8), obtained through Equation (12). $\theta c$ is an inclining angle of the thigh (9) obtained by the leg-attitude computing module (32). $t_1$ is a distance from the center of the hip joint (8) to the center of gravity G1 of the thigh (9), as shown in FIG. 4, while $t_1'$ is a distance from the center of the knee joint (10) to the center of gravity G1 of the thigh (9), as shown as Lc$-t_1$ in FIG. 4. These values $t_1$ and $t_1'$ are determined based on a location of the center of gravity G1 and a size (length) of the thigh (9), previously obtained.

Then, a gravity compensation torque computing module (72) computes a gravity compensation torques by multiplying values of knee joint moments and hip joint moments, obtained by the joint moment estimating module (71), by certain factors. The factors are given as constants refereed to as assist ratios. In human assist systems comprising electric motors or the like for supplying knee joints (10) and hip joints (8) with assist torques, to assist operations of the person (1), assist ratios are determine to compensate certain ratios of joint moments. Gravity compensation torques obtained as mentioned above, are used for control of human assist systems.

The operations mentioned above are successively carried out periodically to successively estimate, in real time, ground reaction force acting on each (2) of the legs, moments acting on the knee joint (10) and hip joint (8) of each (2) of the legs and gravity compensation torques on the knee joint (10) and hip joint (8).

Figure 14:
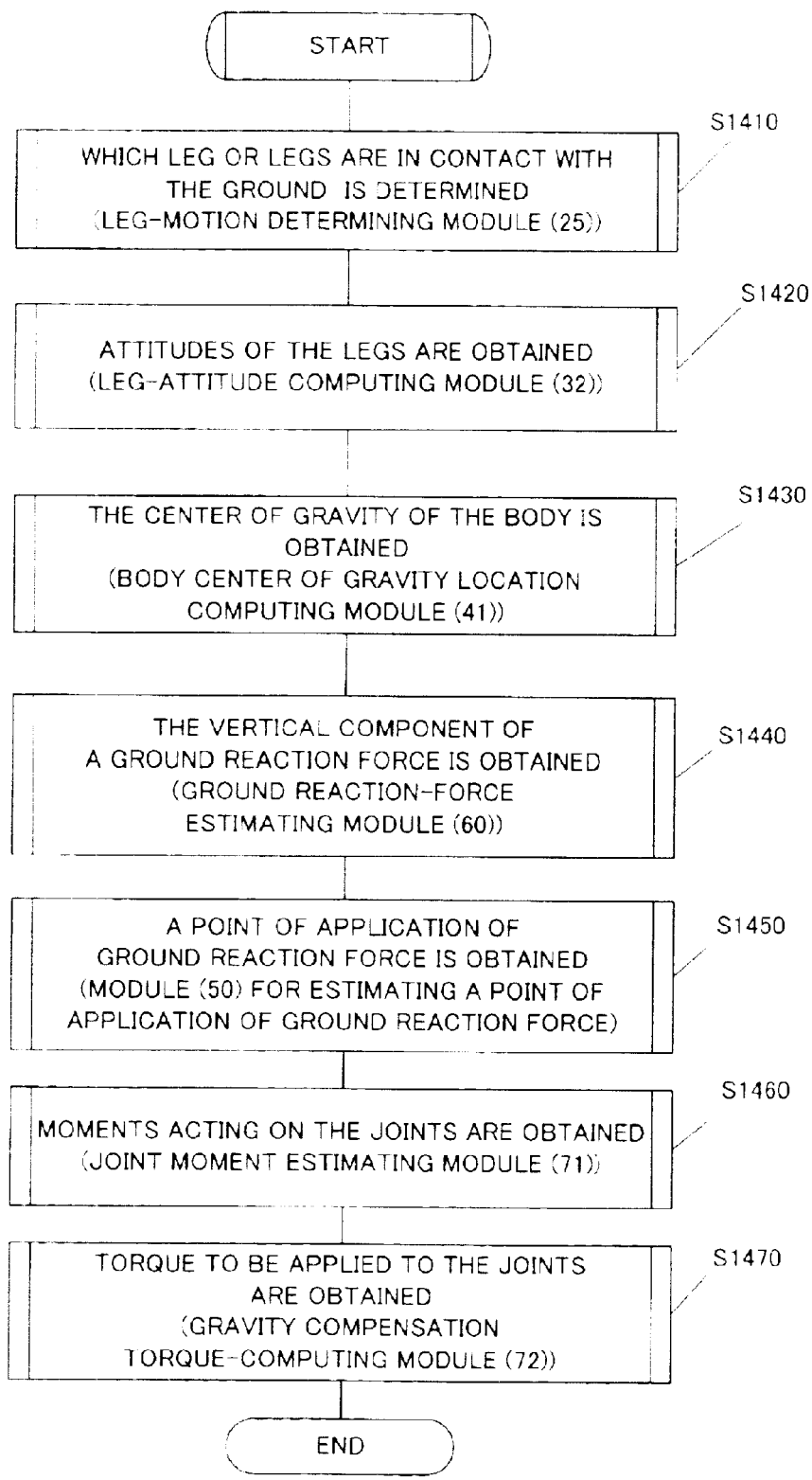
FIG. 14 is a flowchart showing operations of an embodiment of the present invention.

The above-mentioned operations of an embodiment of the present invention are summarized in FIG. 14. At step S1410 the leg-motion determining module (25) determines which leg or legs are in contact with the ground. In place of the leg-motion determining module (25), foot switches (24) or range sensors may be used for the determination. At step S1420, the leg-attitude computing module (32) obtains attitudes of the legs. At step S1430, the body center of gravity-location computing module (41) obtains the center of gravity of the body. At step S1440, the center of gravity-acceleration computing module (42) obtains an acceleration of the body center of gravity. At step S1450, the ground reaction-force estimating module (60) obtains the vertical component of a ground reaction force. At step S1460, the module (50) for estimating a point of application of ground reaction force, obtains a point of application of ground reaction force. At step S1470, the joint moment estimating module (71) obtains moments acting on the joints. At step S1480, gravity compensation torque-computing module (72) obtains torque to be applied to the joints.

Figure 6:
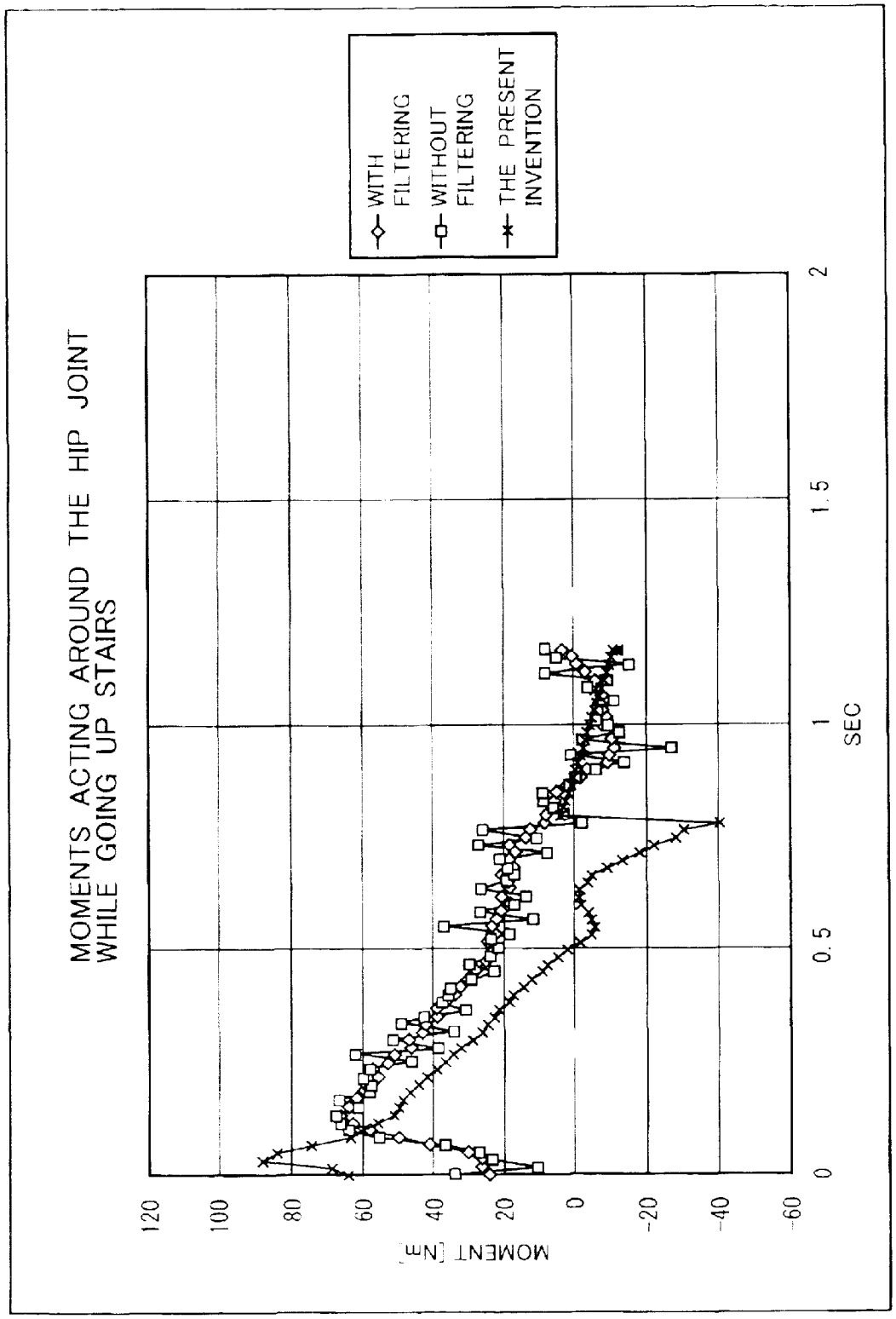
FIG. 6 shows a temporal change in an estimated value of moment acting on the hip joint while the person (1) is going up stairs, obtained thorough an embodiment of the present invention.
Figure 7:
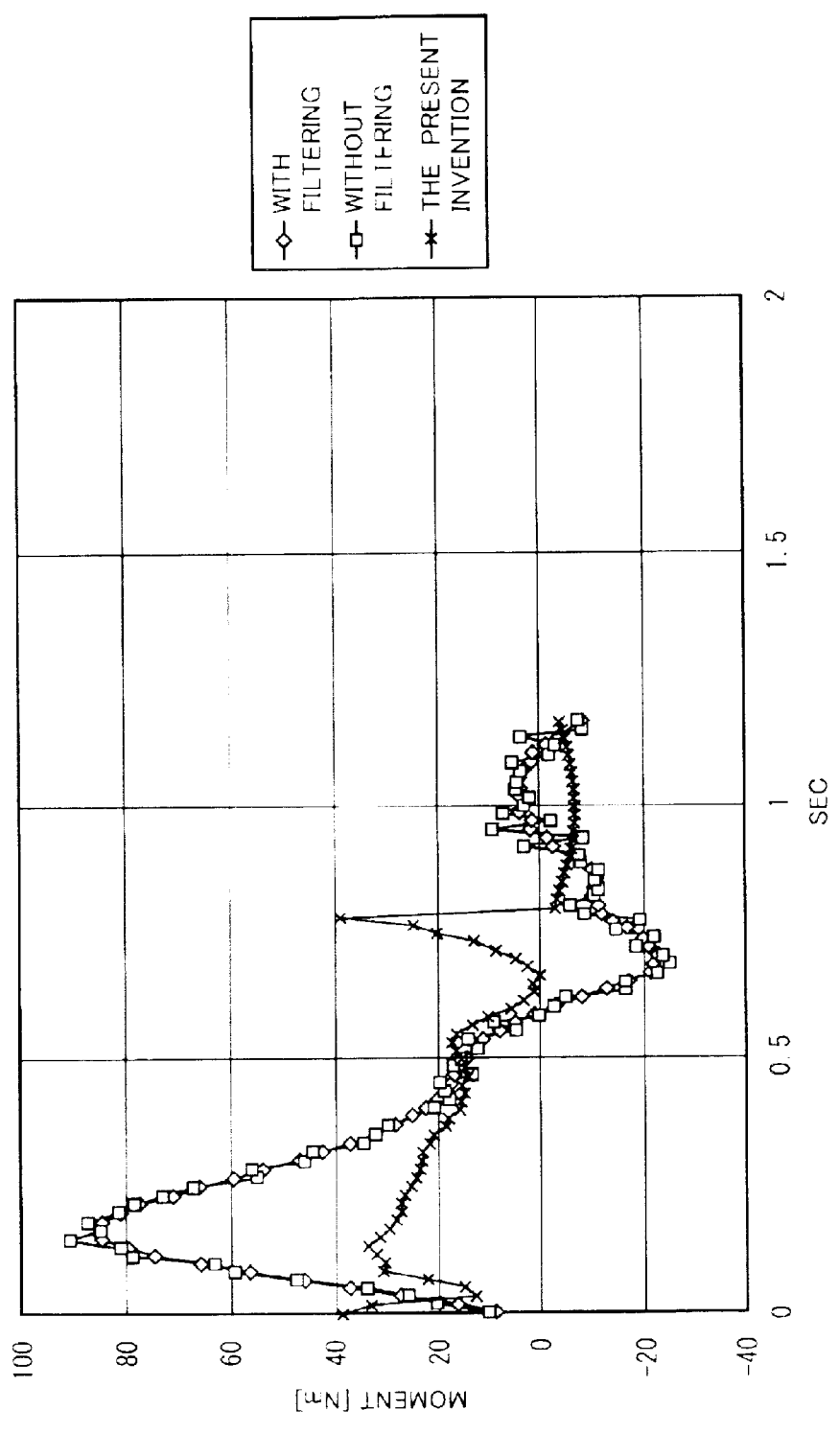
FIG. 7 shows a temporal change in an estimated value of moment acting on the knee joint while the person (1) is going up stairs, obtained thorough an embodiment of the present invention.
Figure 8:
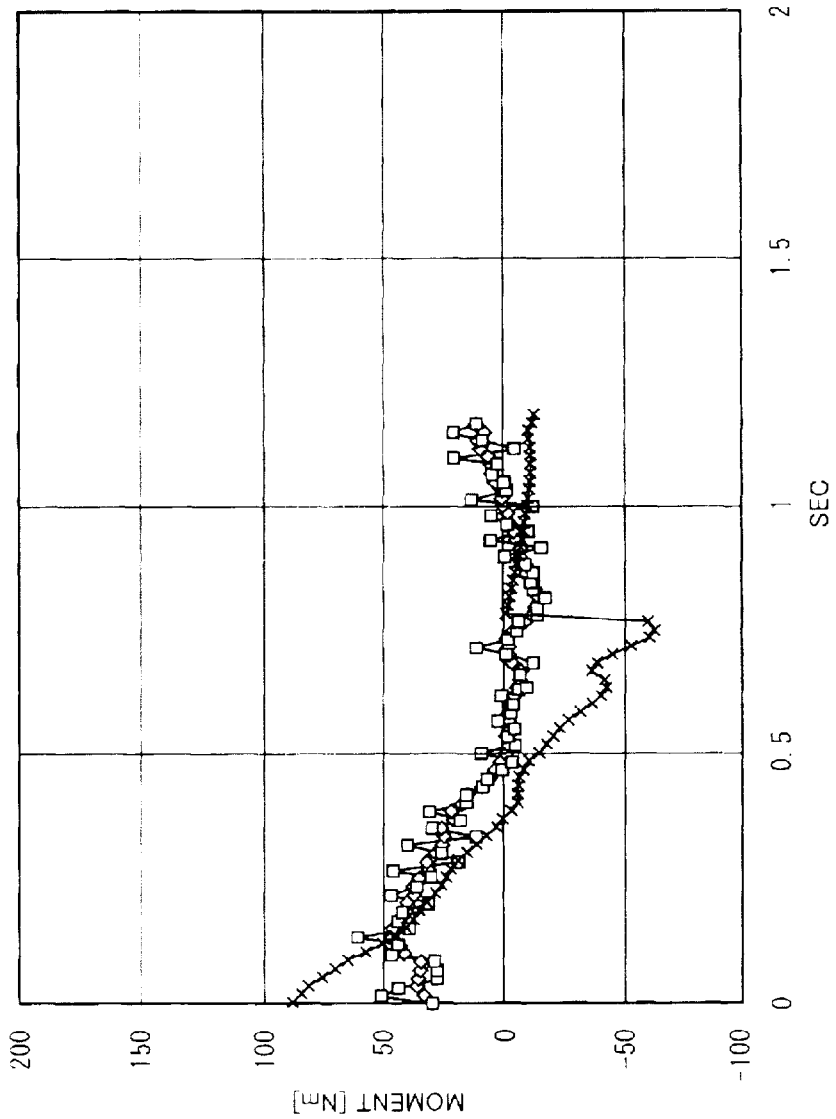
FIG. 8 shows a temporal change in an estimated value of moment acting on the hip joint while the person (1) is going down stairs, obtained thorough an embodiment of the present invention.
Figure 9:
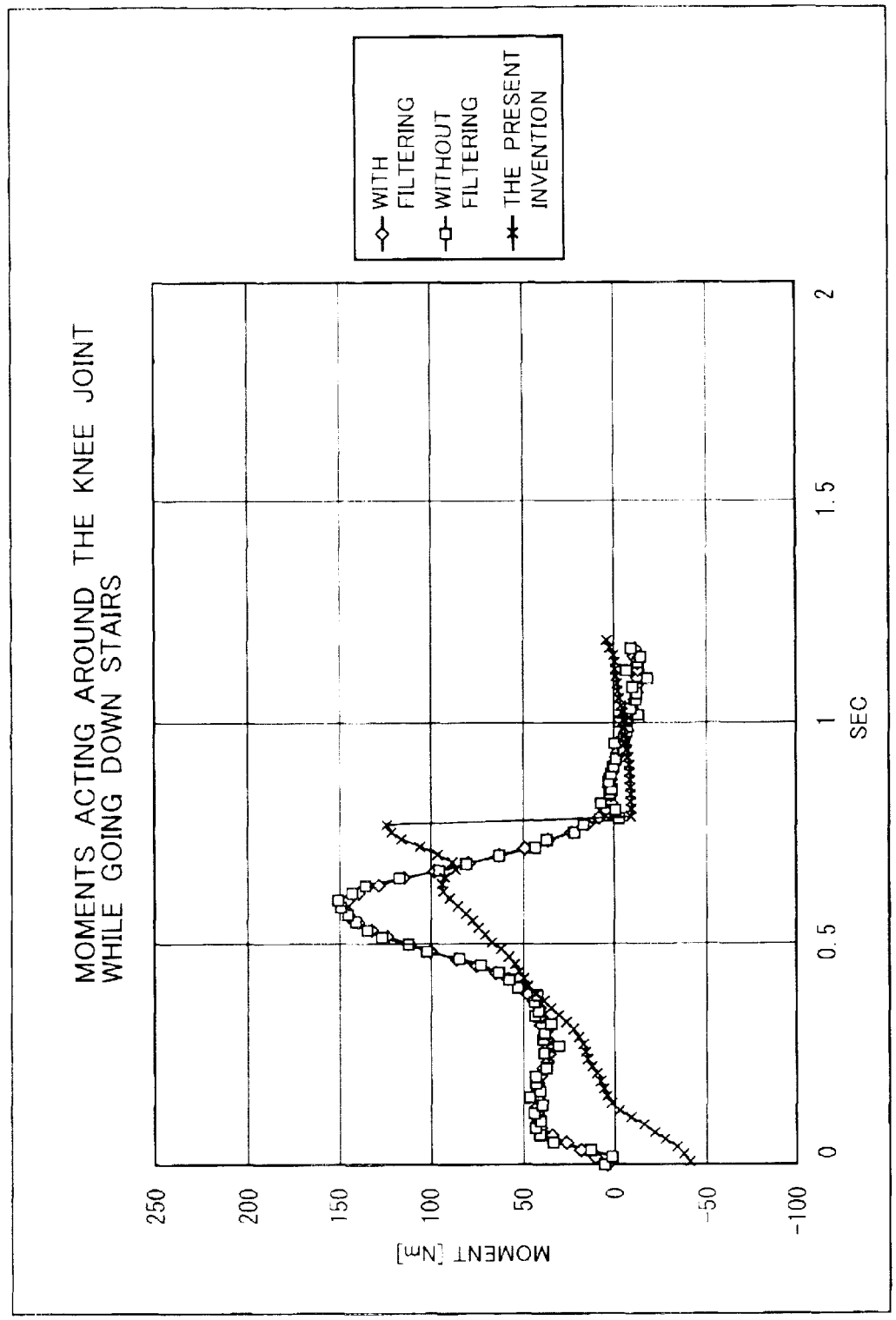
FIG. 9 shows a temporal change in an estimated value of moment acting on the knee joint while the person (1) is going down stairs, obtained thorough an embodiment of the present invention.
Figure 10:
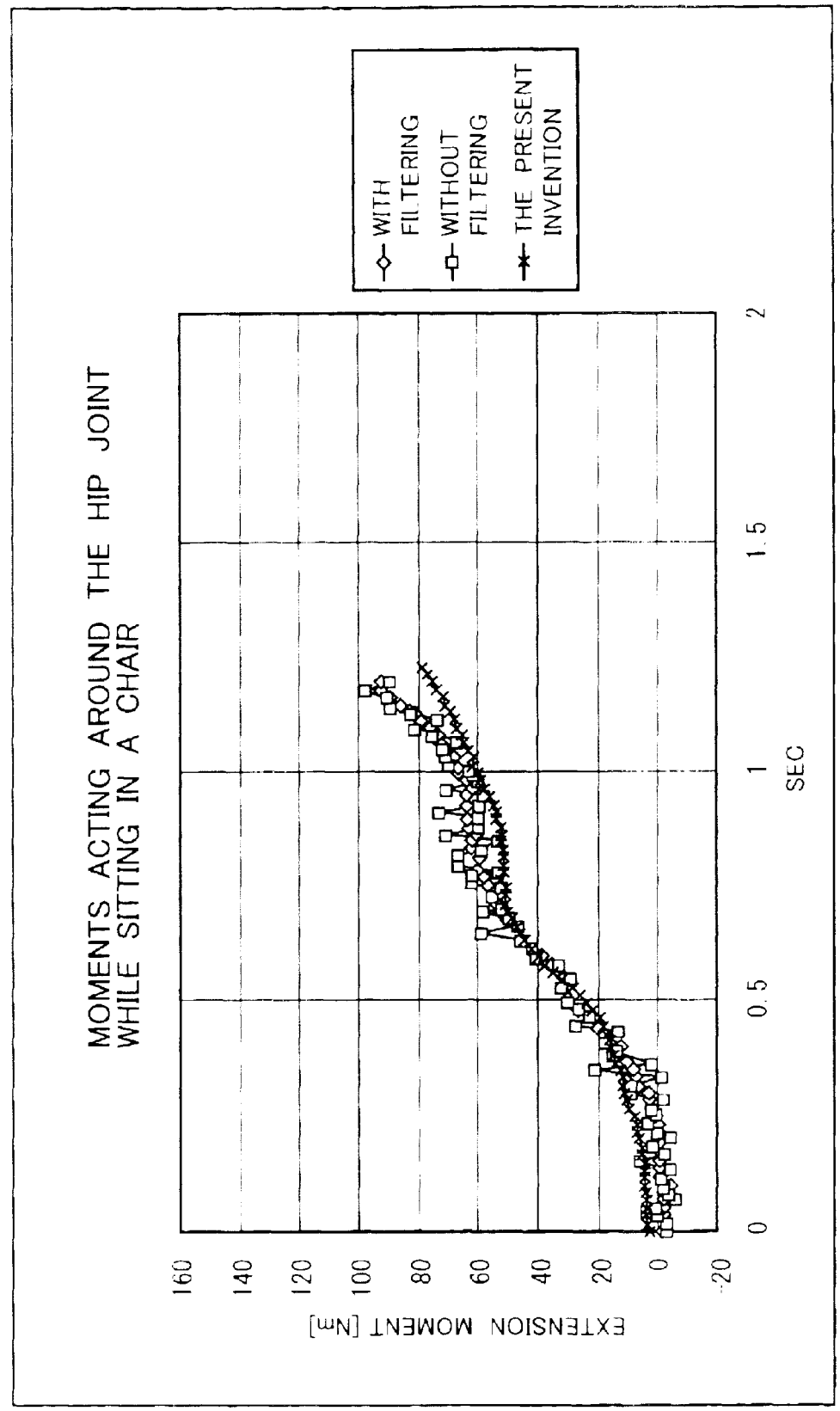
FIG. 10 shows a temporal change in an estimated value of moment acting on the hip joint while the person (1) is sitting in a chair, obtained thorough an embodiment of the present invention.
Figure 11:
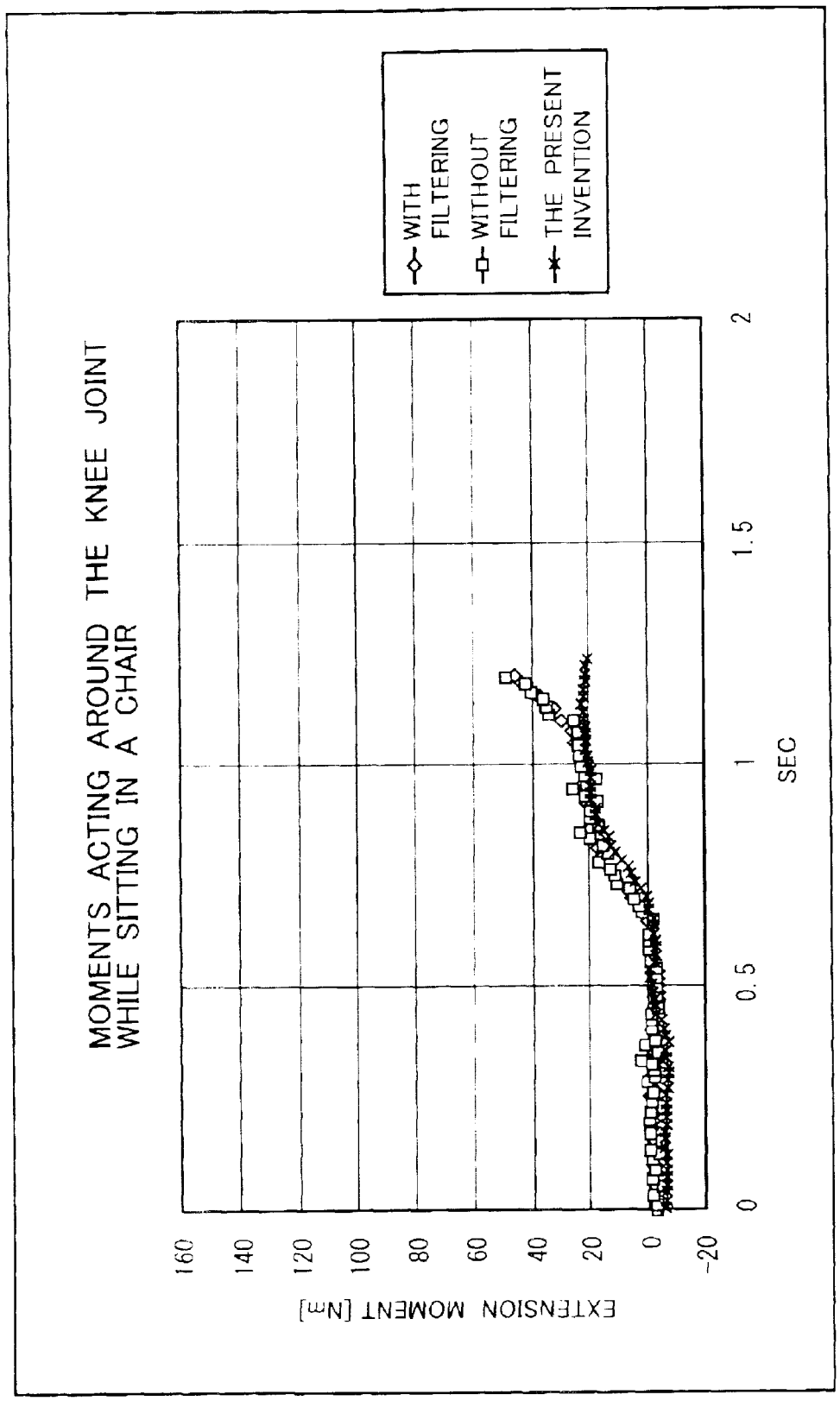
FIG. 11 shows a temporal change in an estimated value of moment acting on the knee joint while the person (1) is sitting in a chair, obtained thorough an embodiment of the present invention.
Figure 12:
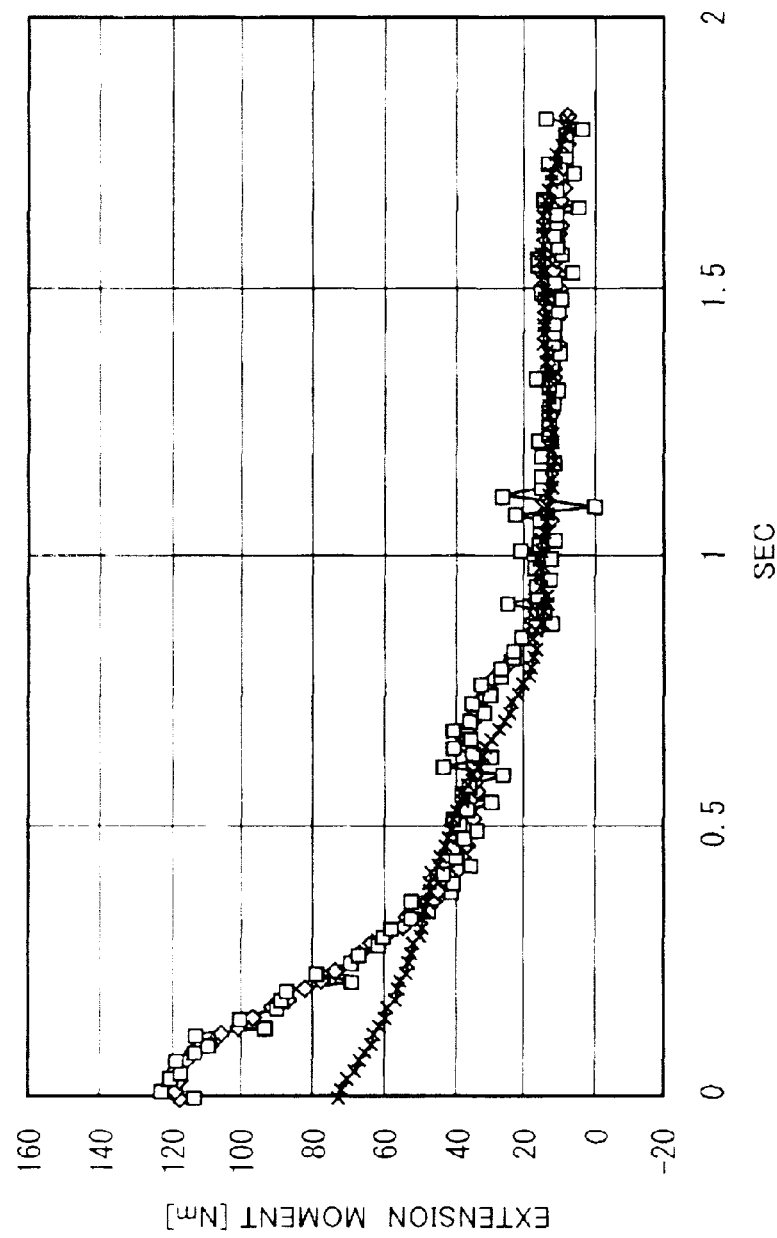
FIG. 12 shows a temporal change in an estimated value of moment acting on the hip joint while the person (1) is rising from a chair, obtained thorough an embodiment of the present invention.
Figure 13:
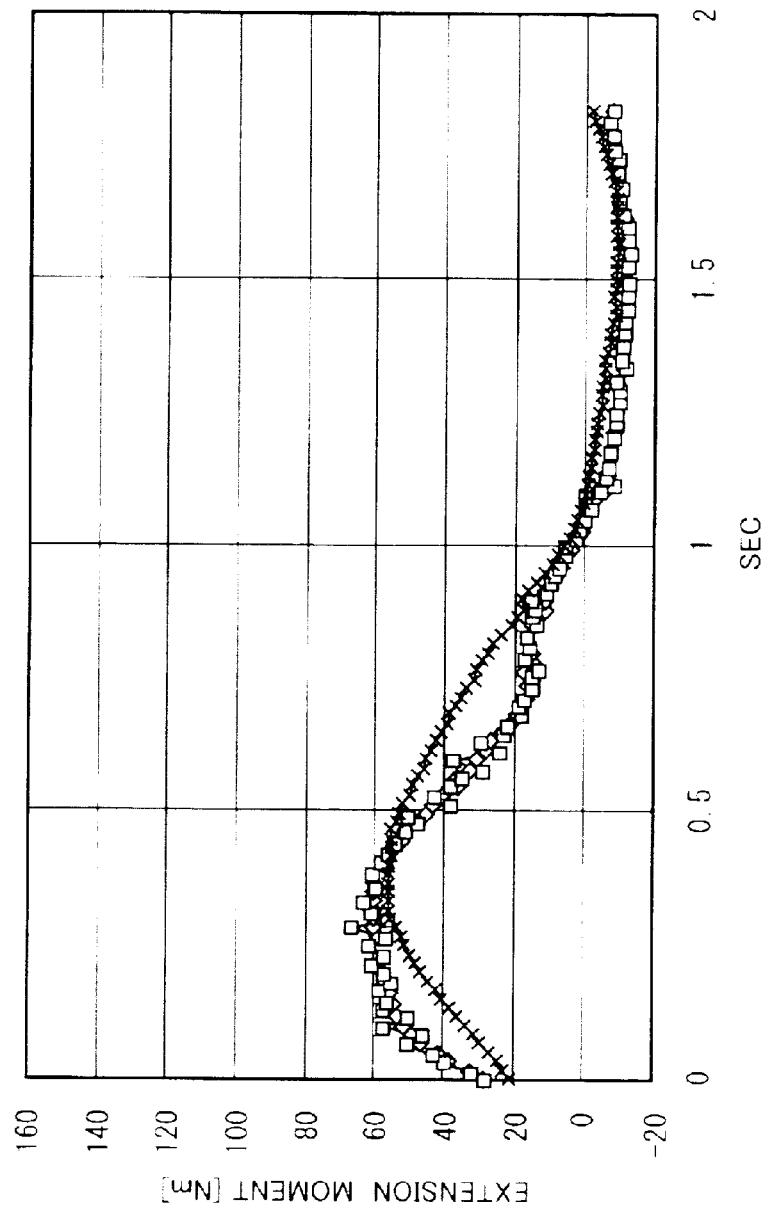
FIG. 13 shows a temporal change in an estimated value of moment acting on the knee joint while the person (1) is rising from a chair, obtained thorough an embodiment of the present invention.

Temporal changes in estimated values of moments acting on the joints, obtained by the above-mentioned operations of the processor (16), are shown with Δ in FIGS. 6 to 13. In FIGS. 6 to 13, ◇ shows estimated values of moments acting on the joints, obtained through steps in which operations are performed using terms of accelerations and terms of horizontal forces, with subsequent filtering. In FIGS. 6 to 13, □ shows estimated values of moments acting on the joints, obtained through steps in which operations include terms of accelerations and terms of horizontal forces, without subsequent filtering. FIG. 6 shows moments acting on the hip joint while the person (1) is going up stairs. FIG. 7 shows moments acting on the knee joint while the person (1) is going up stairs. FIG. 8 shows moments acting on the hip joint while the person (1) is going down stairs. FIG. 9 shows moments acting on the knee joint while the person (1) is going down stairs. FIG. 10 shows moments acting on the hip joint while the person (1) is sitting in a chair. FIG. 11 shows moments acting on the knee joint while the person (1) is sitting in a chair. FIG. 12 shows moments acting on the hip joint while the person (1) is rising from a chair. FIG. 13 shows moments acting on the knee joint while the person (1) is rising from a chair.

In the steps of the present invention for obtaining moments acting on the joints, operations are performed without using terms of accelerations and terms of horizontal forces. However, referring to FIGS. 6 to 13, changes in estimated values of moments on the joints according to the present invention, are similar to those obtained through a method in which operations are performed using terms of accelerations and terms of horizontal forces. In particular, changes in estimated values during periods while the person (1) is sitting in a chair and the person (1) is rising from a chair, are very similar to those obtained through a method in which operations are performed using terms of accelerations and terms of horizontal forces.

As mentioned above, the embodiment allows real-time and easy estimation of ground reaction force acting on each (2) of the legs and moments acting on the hip joint (8) and the knee joint (10) of each (2) of the legs, using relatively small and light sensors and without setting to the legs (2) such sensors as hinder the person (1) from walking or make load of motion heavy. The relatively small and light sensors include the angular sensors (22, 23) set on the hip joints (8) and the knee joints (10) and the gyroscopic sensors (14, 19) and accelerometers (15, 20, 21). Further, in the steps for obtaining moments acting on the joints, operations are performed without using terms of accelerations and terms of horizontal forces. Accordingly, noises caused by operations of terms of accelerations can be eliminated and real-time operations can be easily achieved in the absence of operations of terms of accelerations. In particular, accurate estimation can be carried out while the person (1) sitting in and rising from a chair.

In the embodiment mentioned above, the present invention is applied to the person (1). The present invention can be applied also to biped walking robots as biped walking systems. In some biped walking robots, the hip and the chest are integrated. In such cases a gyroscopic sensor and a accelerometer for the horizontal direction are attached to either the hip or the chest alone to estimate ground reaction forces and joint moments on the legs in a similar way to that of the above-mentioned embodiment. Further, in biped waking robots, bending angles of the hip joints and the knee joints can be obtained through controlled variables of control devices for joint actuators.

In the embodiment mentioned above, data detected by the hip vertical accelerometer (21) are directly used to determine a phase of motions of the legs (2). In place of the detected data, for example, the vertical component of acceleration a0 of the hip (3) in the absolute coordinate system Cf, obtained by the reference-acceleration measuring module (28), can be used.

As mentioned above, according to the present invention, joint moments acting on the legs of walking systems can be obtained and torques to be applied to the joints can further be obtained, in control of human assist systems and in control of movement of biped walking robots. Such human assist systems are intended to assist human operations against gravity including going up and down stairs, sitting and standing up, squatting, and moving up and down with heavy load.

What is claimed is:

1. A method for determining torques to be applied to joints of a leg of a biped walking system, comprising the steps of:

determining which leg or legs are in contact with the ground;

determining the vertical component of a ground reaction force acting on the leg, based on which leg or legs are in contact with the ground;

determining a point of application of the ground reaction force;

calculating a moment of the ground reaction force based on the vertical component of the ground reaction force and the point of application of the ground reaction force;

calculating moments acting around the joints of the leg, using the moment of the ground reaction force, the vertical components of forces acting on the joints of the leg and a term of the acceleration of gravity and without using the horizontal components of the forces acting on the joints of the leg and a term of acceleration except the term of the acceleration of gravity; and determining the torques to be applied to the joints of the leg, based on the moments acting around the joints of the leg.

2. A method according to claim 1, wherein in a single-support mode the vertical component of the ground reaction force acting on the leg is assumed to be M·g and in a double-support mode the vertical component of the ground reaction force acting on each of the legs is assumed to be (½)

·M·g, where M is a weight of a person and g is the acceleration of gravity.

3. A method according to claim 1 or 2, wherein in the step of determining which leg or legs are in contact with the ground, the determination is made based on a value of the vertical component of acceleration measured on the body.

4. A method according to claim 1 or 2, in the step of determining which leg or legs are in contact with the ground, the determination is made using a sensor.

5. A method according to claim 1, wherein in the step of determining a point of application of the ground reaction force, the point is determined based on the attitude of the leg and a location of the center of gravity of the body.

6. A method according to claim 5, wherein in the step of determining a point of application of the ground reaction force, the point is determined further using information from a sensor.

7. A method according to claim 1, wherein in the step of determining moments acting around the joints of the leg, at first the vertical component of a force acting on and a moment acting around the knee joint of the shin, are determined using the vertical component of the ground reaction force acting on the shin at the point of application of the ground reaction force and a term of the acceleration of gravity and without using the horizontal component of the ground reaction force and a term of acceleration except the term of the acceleration of gravity, and then the vertical component of a force acting on and a moment acting around the hip joint of the thigh, are determined using the vertical component of a force acting on and a moment acting around the knee joint of the thigh and a term of the acceleration of gravity and without using the horizontal component of the horizontal component of the force acting on the knee joint and a term of acceleration except the term of the acceleration of gravity.

8. A method for determining moments acting around joints of a leg of a biped walking system, comprising the steps of:

determining which leg or legs are in contact with the ground;

determining the vertical component of a ground reaction force acting on the leg, based on which leg or legs are in contact with the ground;

determining a point of application of the ground reaction force;

calculating a moment of the ground reaction force based on the vertical component of the around reaction force and the point of application of the ground reaction force; and calculating the moments acting around the joints of the leg, using the moment of the ground reaction force, the vertical components of forces acting on the joints of the leg and a term of the acceleration of gravity and without using the horizontal components of the forces acting on the joints of the leg and a term of acceleration except the term of the acceleration of gravity.

9. A processor for determining torques to be applied to joints of a leg of a biped walking system, the processor being operable in association with angular sensors on the joints and at least one sensor set on the body of the biped walking system, wherein the processor is configured to perform the steps of:

determining which leg or legs are in contact with the ground, using information from the at least one sensor set on the body;

determining an attitude of the leg, using information from the angular sensors;

determining a location of the center of gravity of the whole body including the leg;

determining the vertical component of a ground reaction force acting on the leg, based on which leg or legs are in contact with the ground;

determining a point of application of the ground reaction force, using the attitude of the leg and the location of the center of gravity of the whole body;

calculating a moment of the ground reaction force based on the vertical component of the ground reaction force and the point of application of the ground reaction force;

calculating moments acting around the joints of the leg, using the moment of the ground reaction force, the vertical components of forces acting on the joints of the leg and a term of the acceleration of gravity and without using the horizontal components of the forces acting on the joints of the leg and a term of acceleration except the term of the acceleration of gravity; and determining the torques to be applied to the joints of the leg, based on the moments acting around the joints of the leg.

10. A processor for determining torques to be applied to joints of a leg of a biped walking system, the processor being operable in association with angular sensors on the joints, at least one sensor set on the body of the biped walking system and at least one sensor set on the leg, wherein the processor is configured to perform the steps of:

determining which leg or legs are in contact with the ground, using information from the at least one sensor set on the leg;

determining an attitude of the leg, using information from the angular sensors;

determining a location of the center of gravity of the whole body including the leg;

determining the vertical component of acceleration of the center of gravity of the whole body including the leg, using information from the at least one sensor set on the body;

determining the vertical component of a ground reaction force acting on the leg, based on which leg or legs are in contact with the ground, the attitude of the leg, the location of the center of gravity of the whole body and the vertical component of acceleration of the center of gravity of the whole body;

determining a point of application of the ground reaction force, using the attitude of the leg and the location of the center of gravity of the whole body;

calculating a moment of the ground reaction force based on the vertical component of the ground reaction force and the point of application of the around reaction force;

calculating moments acting around the joints of the leg, using the moment of the around reaction force, the vertical components of forces acting on the joints of the leg and a term of the acceleration of gravity and without using the horizontal components of the forces acting on the joints of the leg and a term of acceleration except the term of the acceleration of gravity; and determining the torques to be applied to the joints of the leg, based on the moments acting around the joints of the leg.

11. A processor for determining moments acting around joints of a leg of a biped walking system, the processor being operable in association with angular sensors on the joints, at least one sensor set on the body of the biped walking system, wherein the processor is configured to perform the steps of:

determining which leg or legs are in contact with the ground, using information from the at least one sensor set on the body;

determining an attitude of the leg, using information from the angular sensors;

determining a location of the center of gravity of the whole body including the leg;

determining the vertical component of acceleration of the center of gravity of the whole body including the leg, using information from the at least one sensor set on the body;

determining the vertical component of a ground reaction force acting on the leg, based on which leg or legs are in contact with the ground;

determining a point of application of the ground reaction force, using the attitude of the leg and the location of the center of gravity of the whole body;

calculating a moment of the ground reaction force based on the vertical component of the around reaction force and the point of application of the around reaction force;

calculating the moments acting around the joints of the leg, using the moment of the ground reaction force, the vertical components of forces acting on the joints of the leg and a term of the acceleration of gravity and without using the horizontal components of the forces acting on the joints of the leg and a term of acceleration except the term of the acceleration of gravity.

12. A processor for determining moments acting around joints of a leg of a biped walking system, the processor being operable in association with angular sensors on the joints, at least one sensor set on the body of the biped walking system and at least one sensor set on the leg, wherein the processor is configured to perform the steps of:

determining which leg or legs are in contact with the ground, using information from the at least one sensor set on the leg;

determining an attitude of the leg, using information from the angular sensors;

determining a location of the center of gravity of the whole body including the leg;

determining the vertical component of acceleration of the center of gravity of the whole body including the leg, using information from the at least one accelerometer;

determining the vertical component of a ground reaction force acting on the leg, based on which leg or legs are in contact with the ground;

determining a point of application of the ground reaction force, using the attitude of the leg and the location of the center of gravity of the whole body;

calculating a moment of the ground reaction force based on the vertical component of the ground reaction force and the point of application of the ground reaction force;

calculating the moments acting around the joints of the leg, using the moment of the ground reaction force, the vertical components of forces acting on the joints of the leg and a term of the acceleration of gravity and without using the horizontal components of the forces acting on the joints of the leg and a term of acceleration except the term of the acceleration of gravity.

\* \* \* \* \*